Fig. 6.

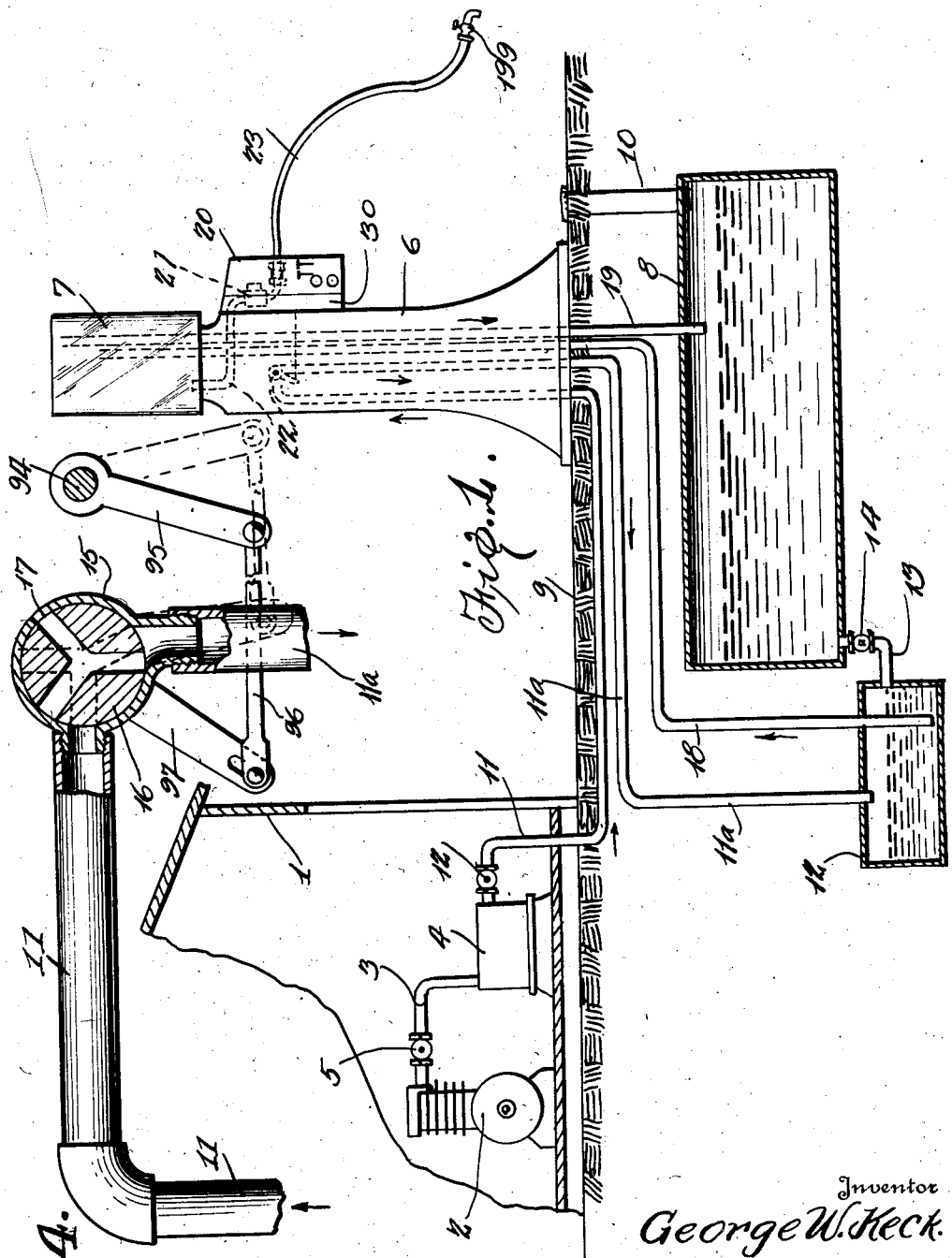

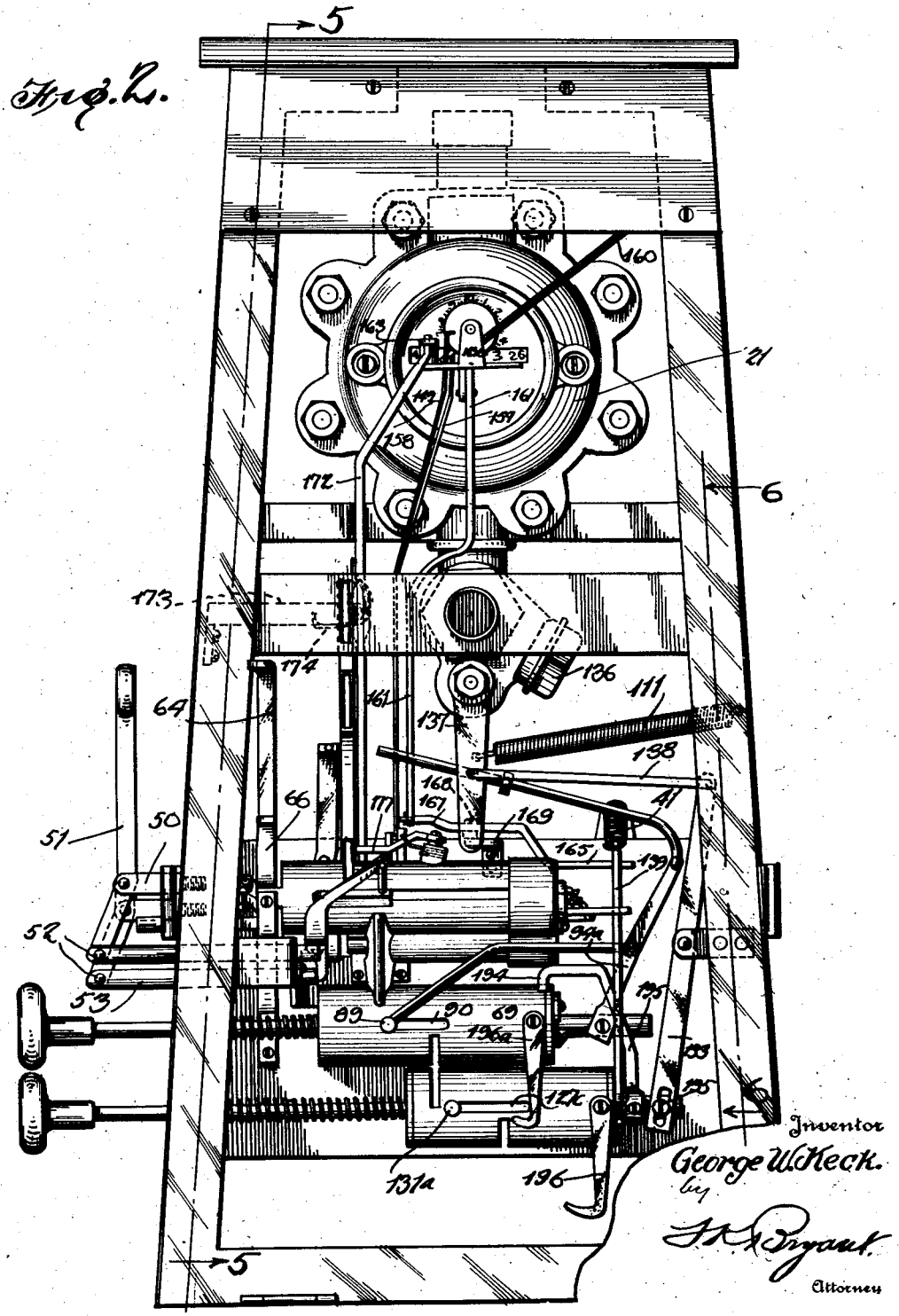

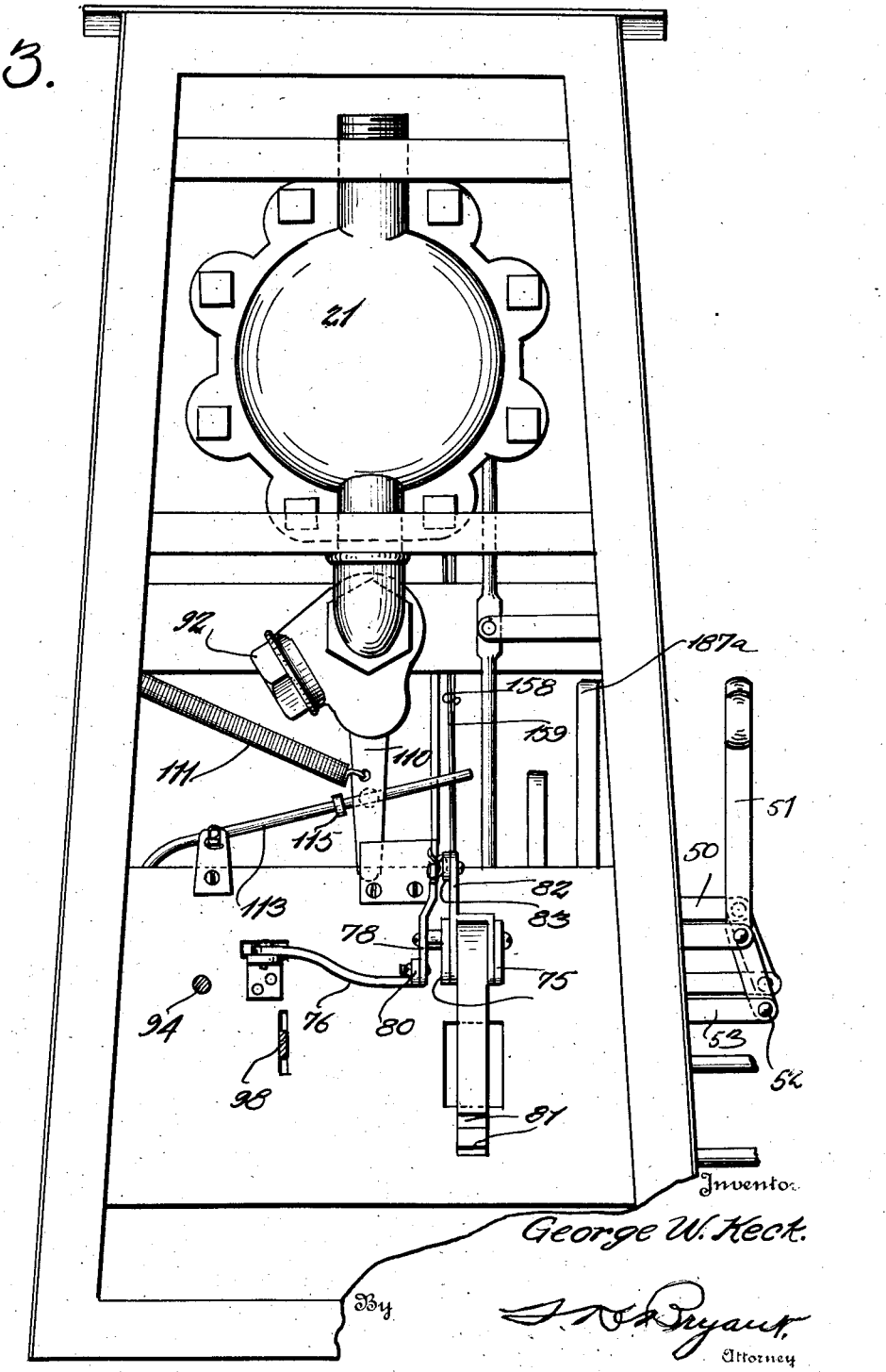

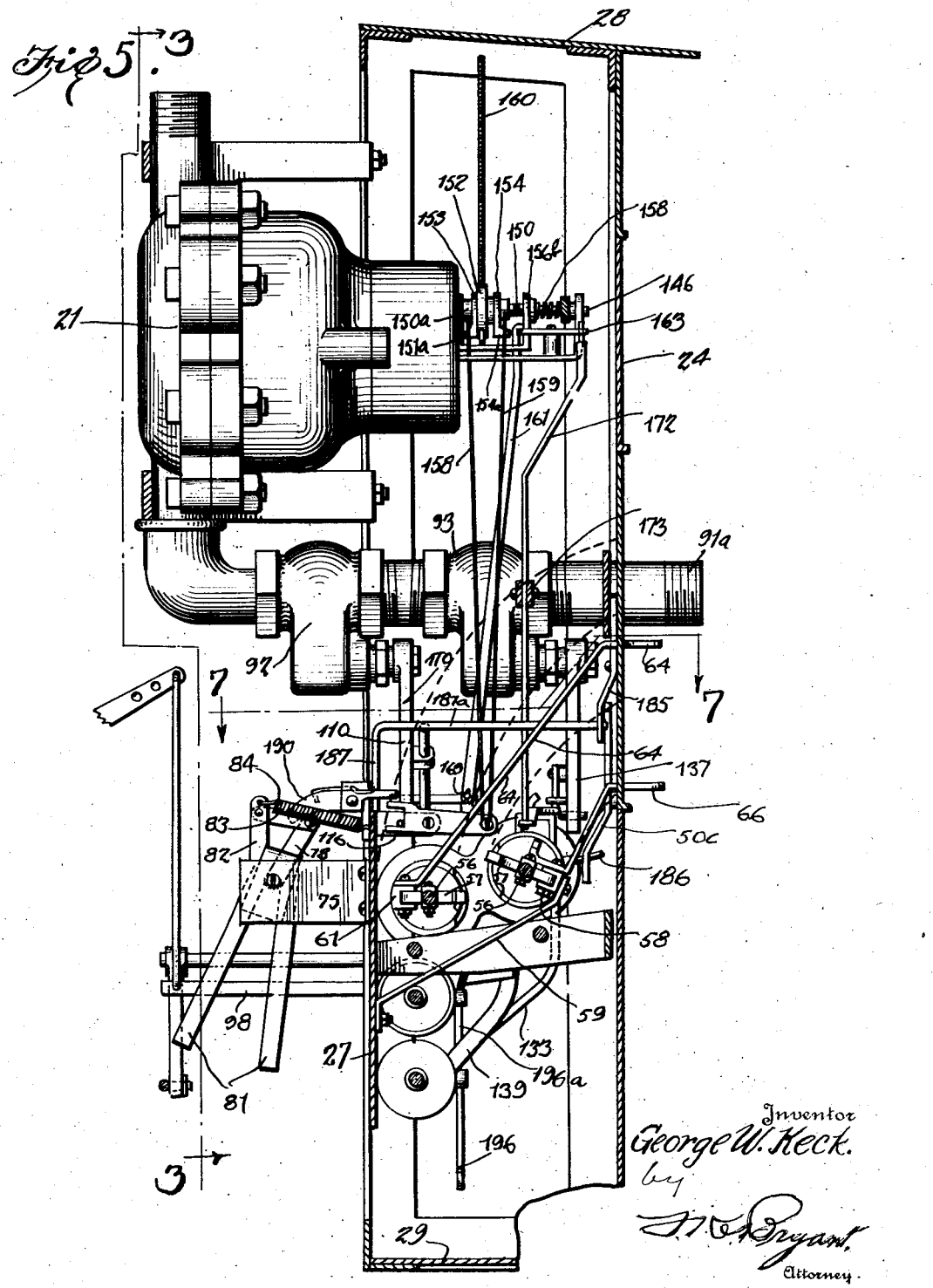

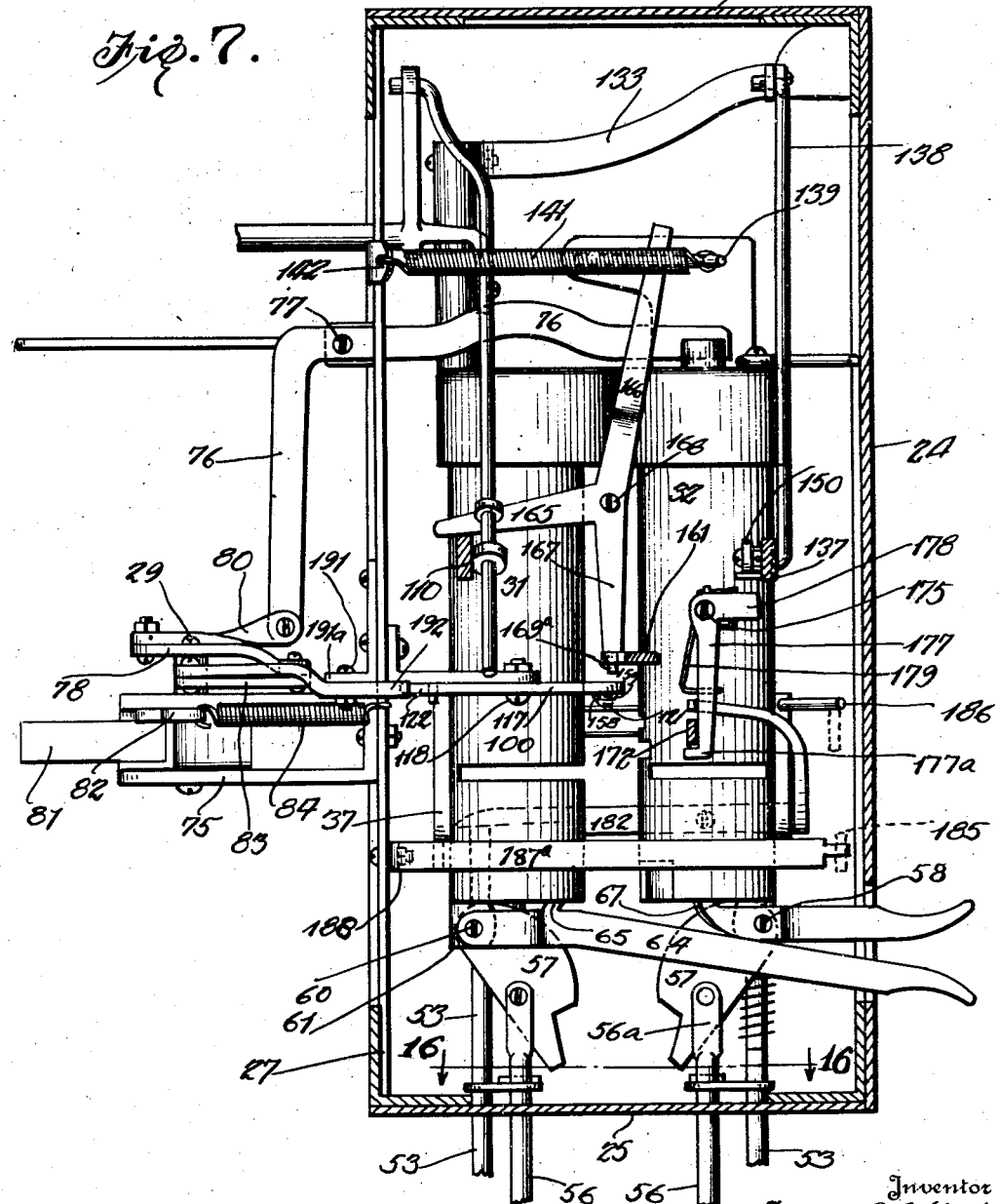

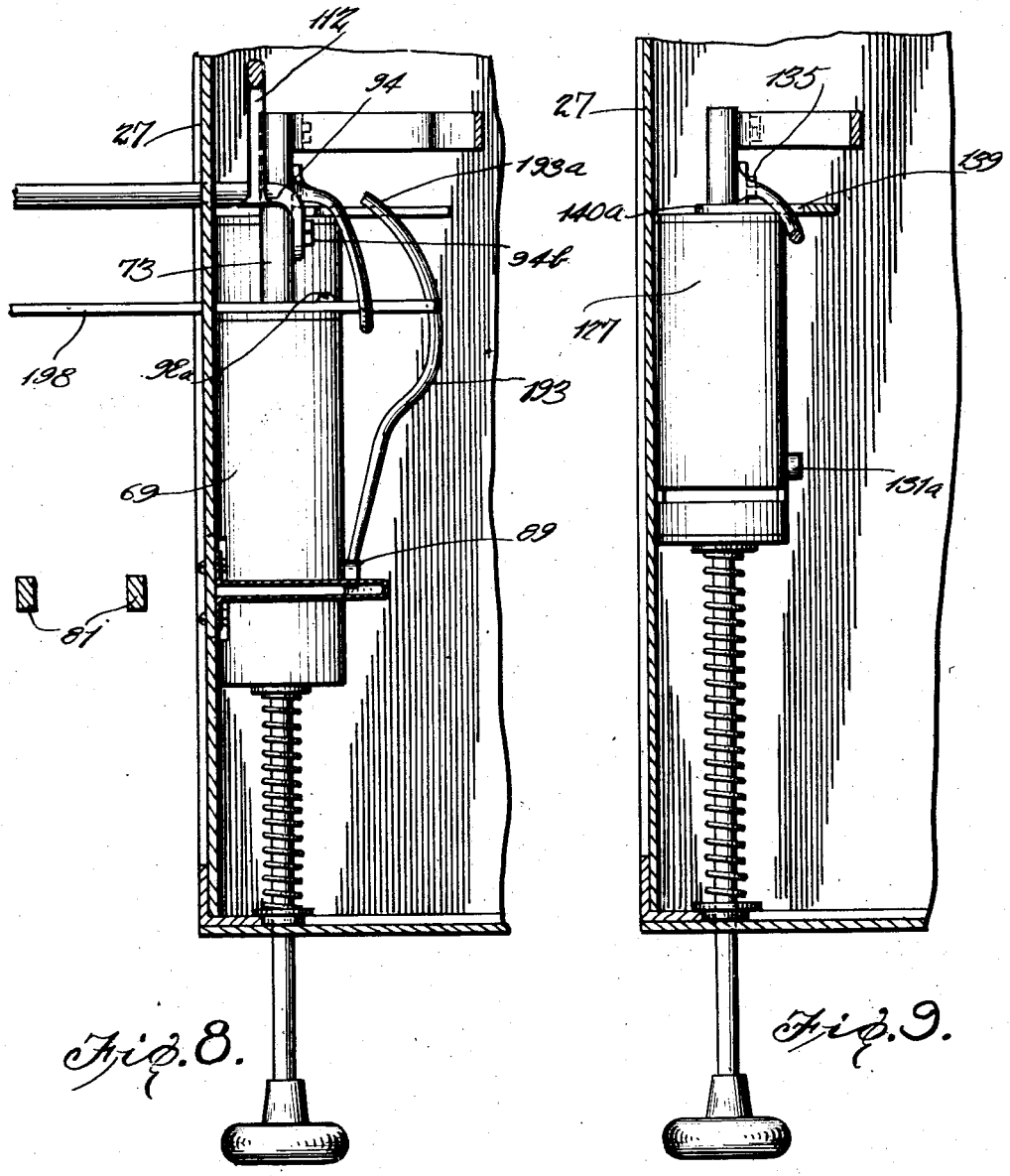

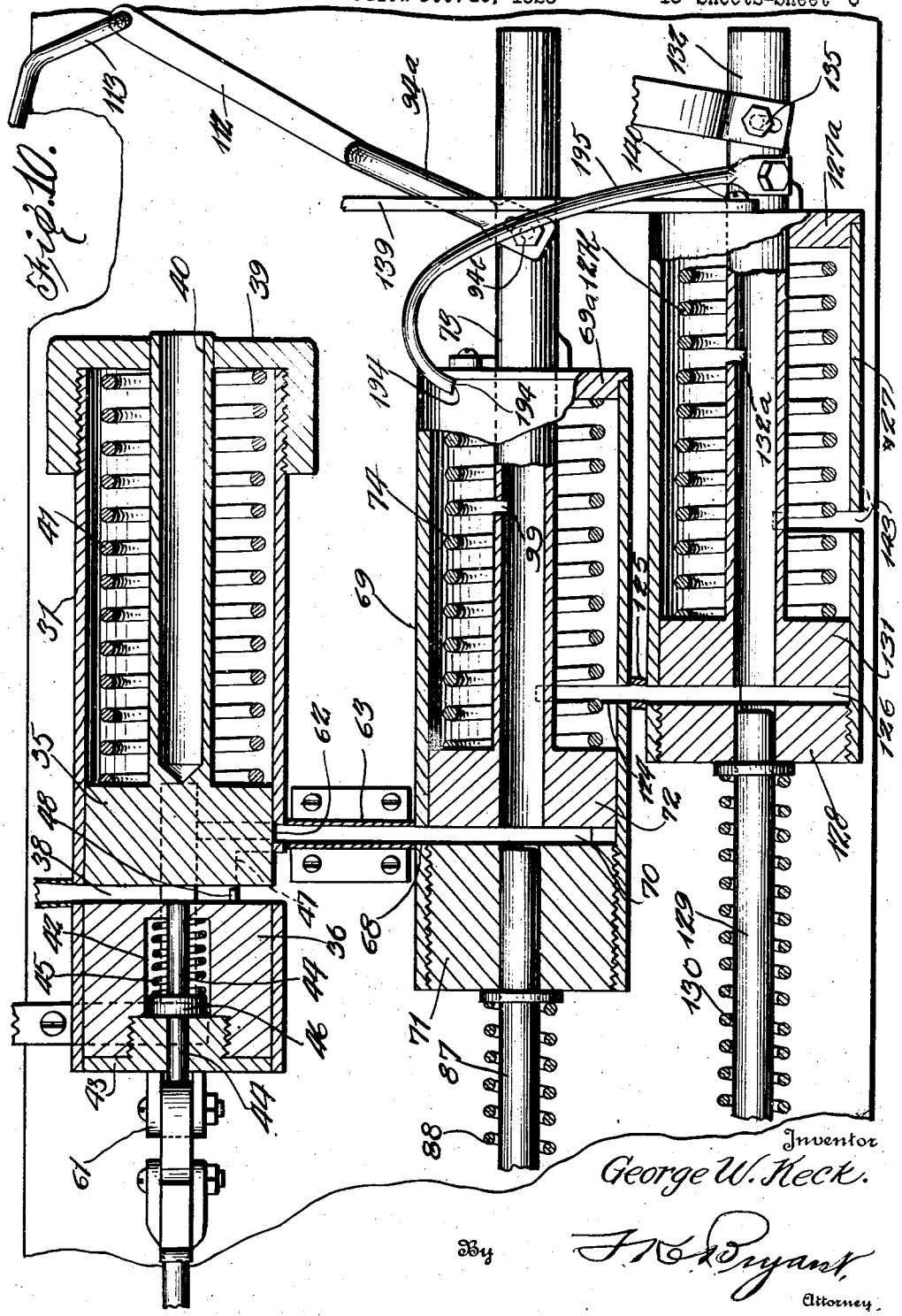

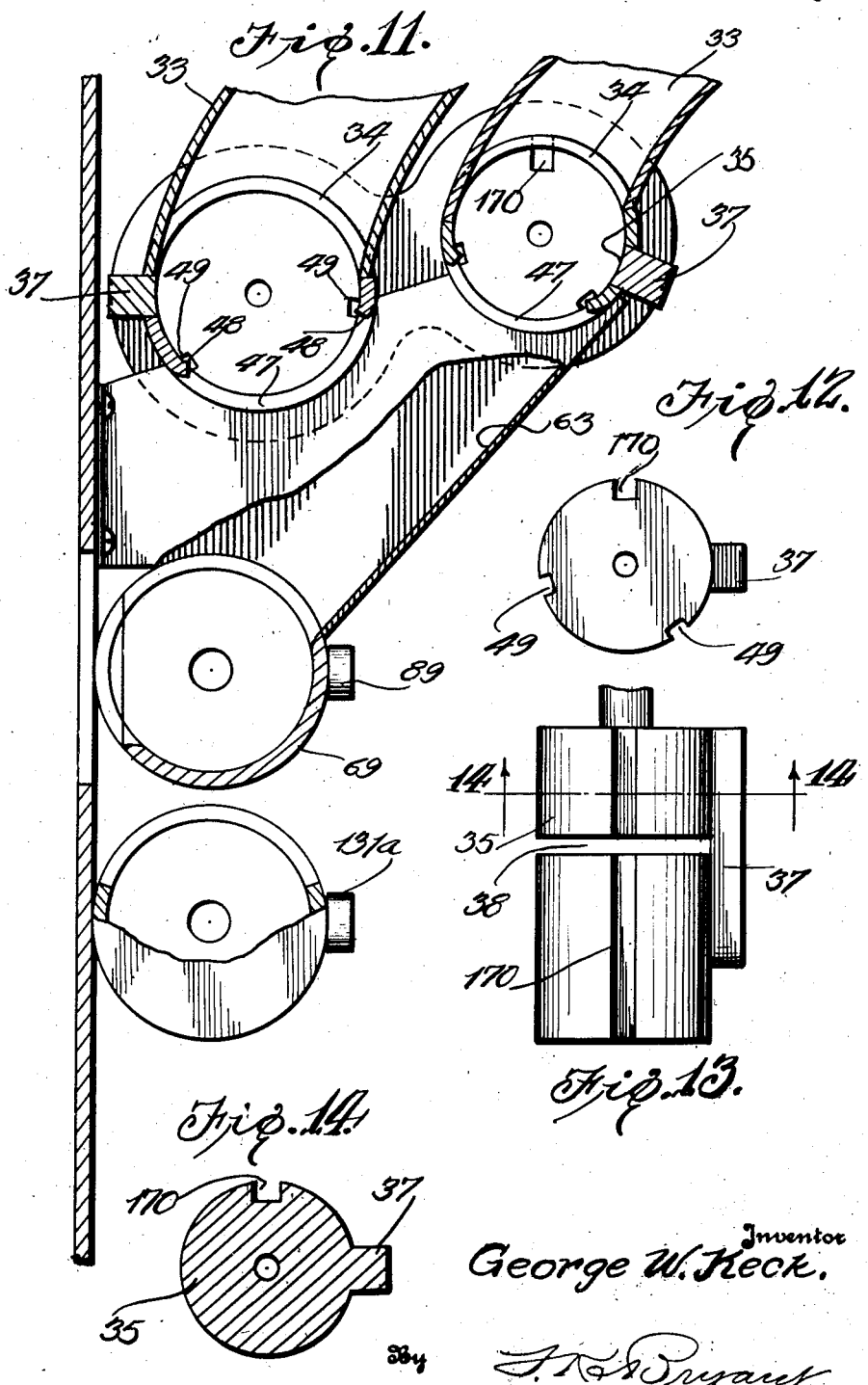

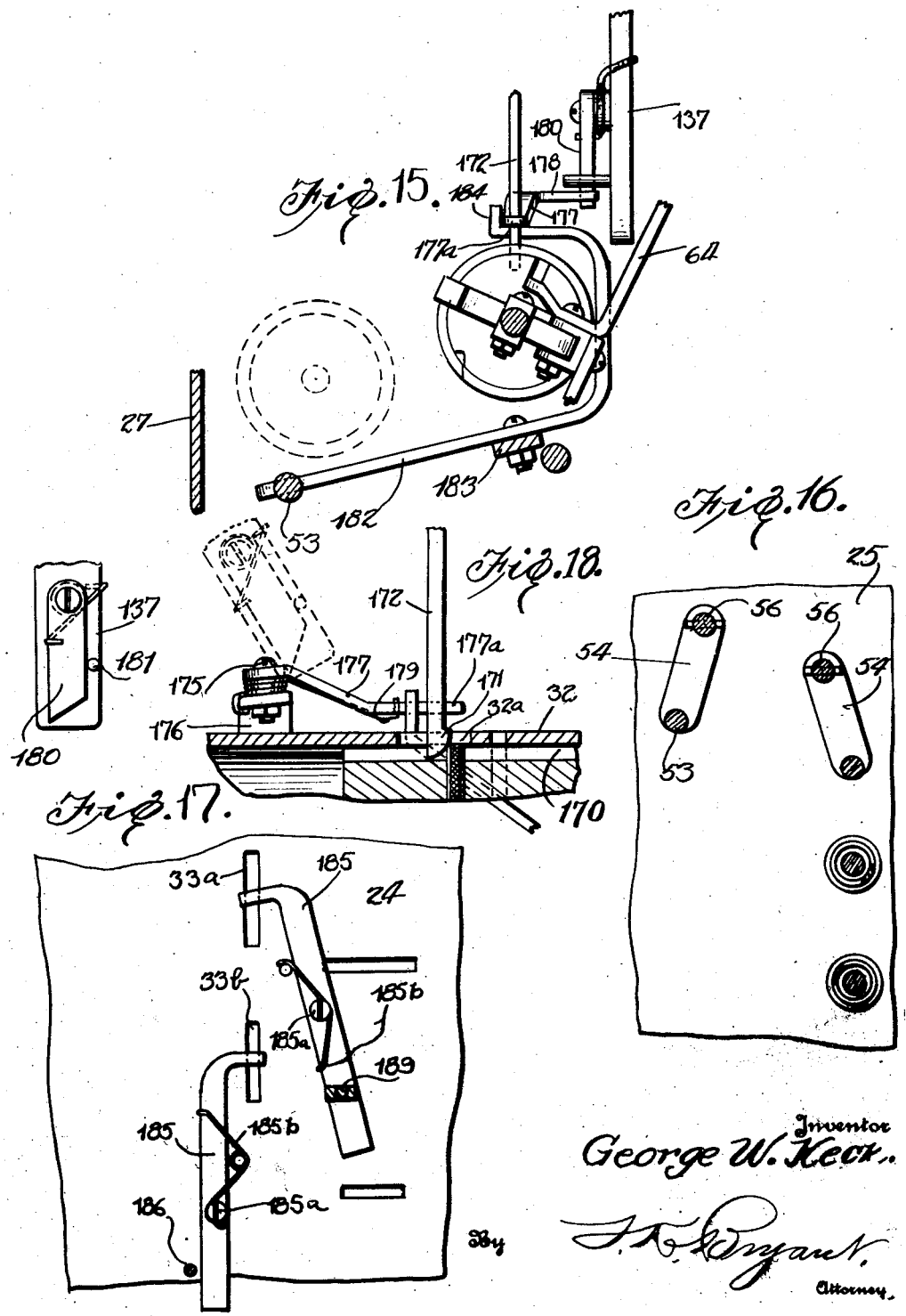

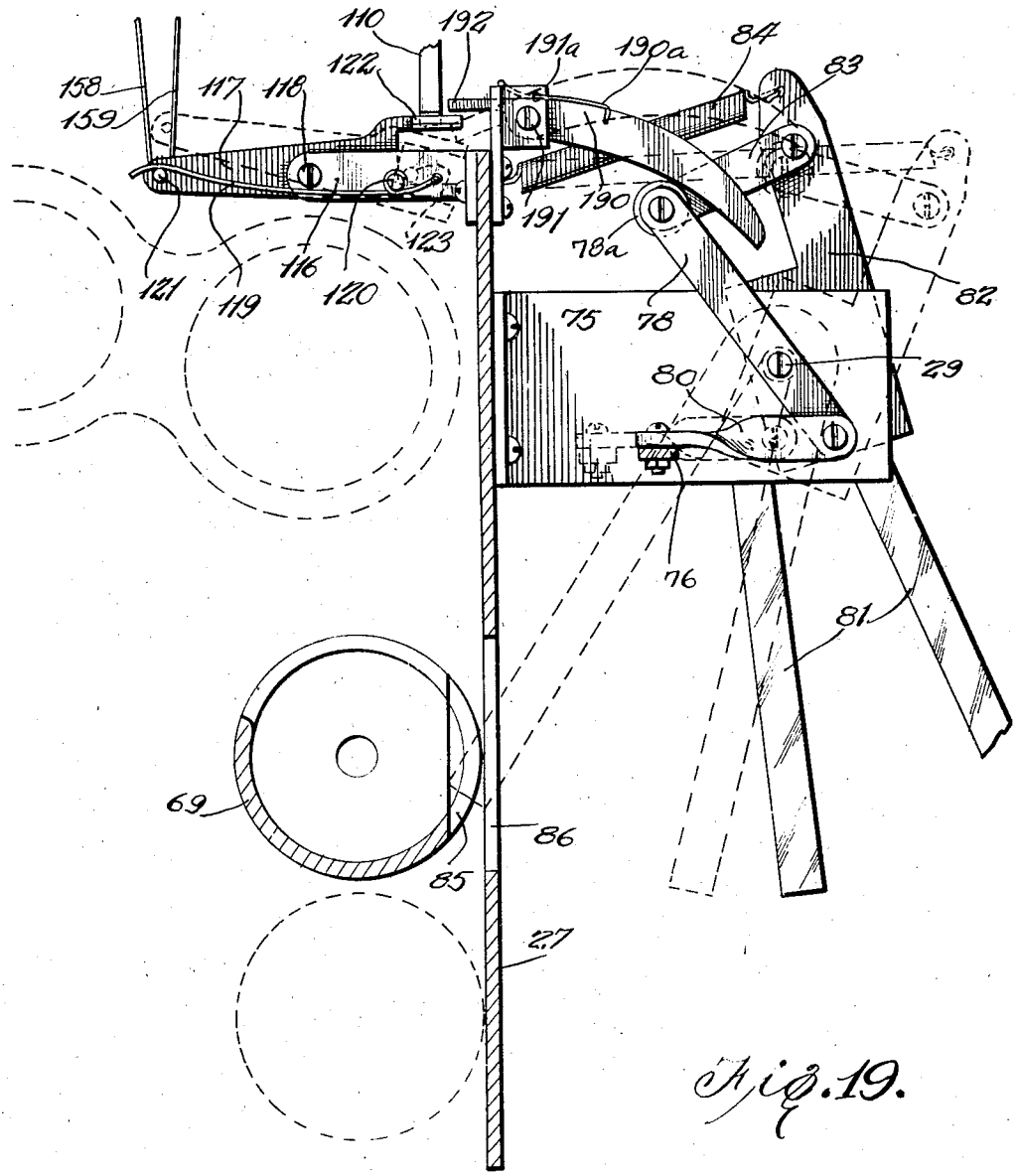

Dec. 13, 1927.  1,652,408
G. W. KECK
SELF SERVICE GASOLINE PUMP ATTACHMENT
Filed Dec. 10, 1926   13 Sheets-Sheet 12
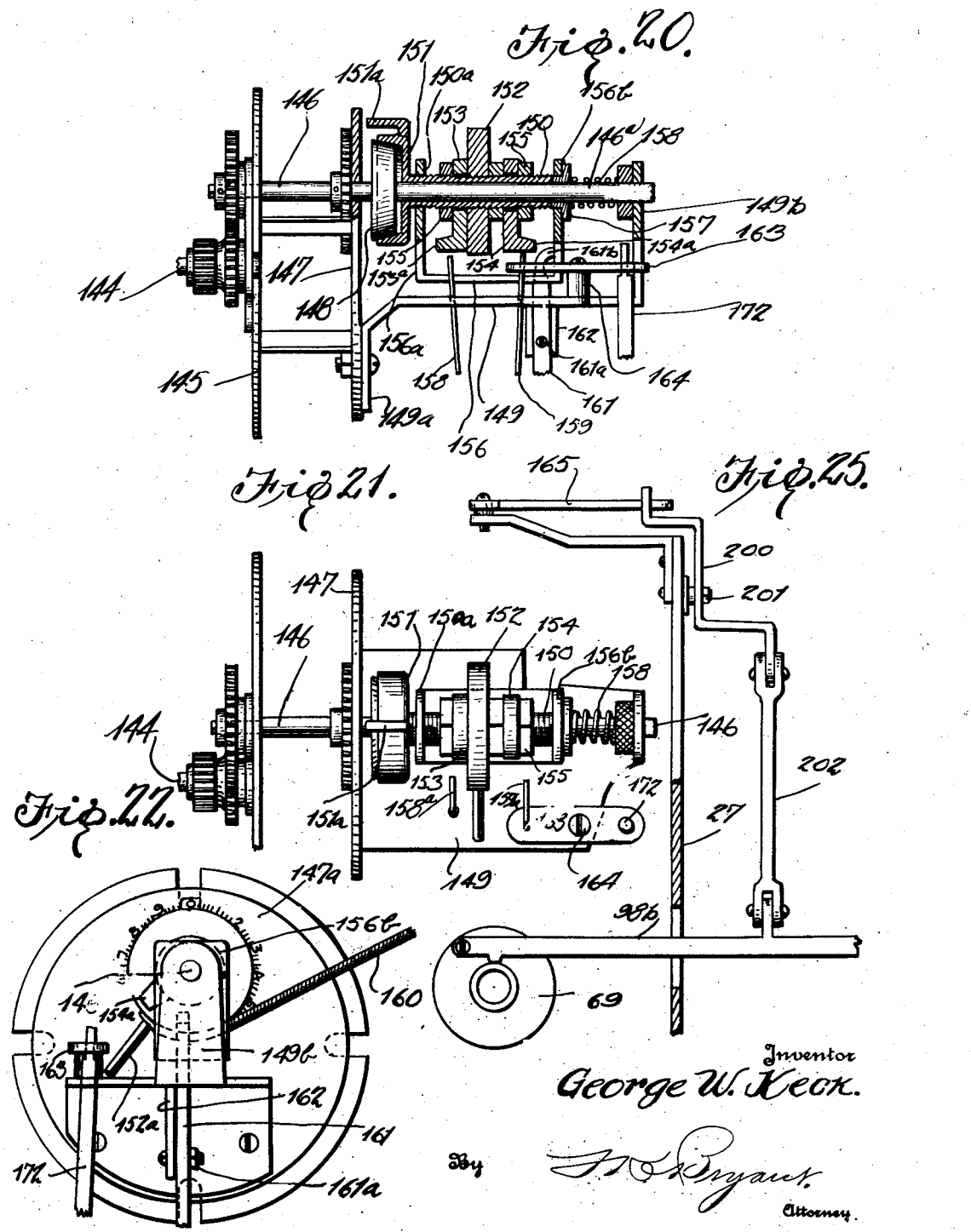

Dec. 13, 1927.  
G. W. KECK  
1,652,408  
SELF SERVICE GASOLINE PUMP ATTACHMENT  
Filed Dec. 10, 1926 13 Sheets-Sheet 13
Fig. 23.
Fig. 24.
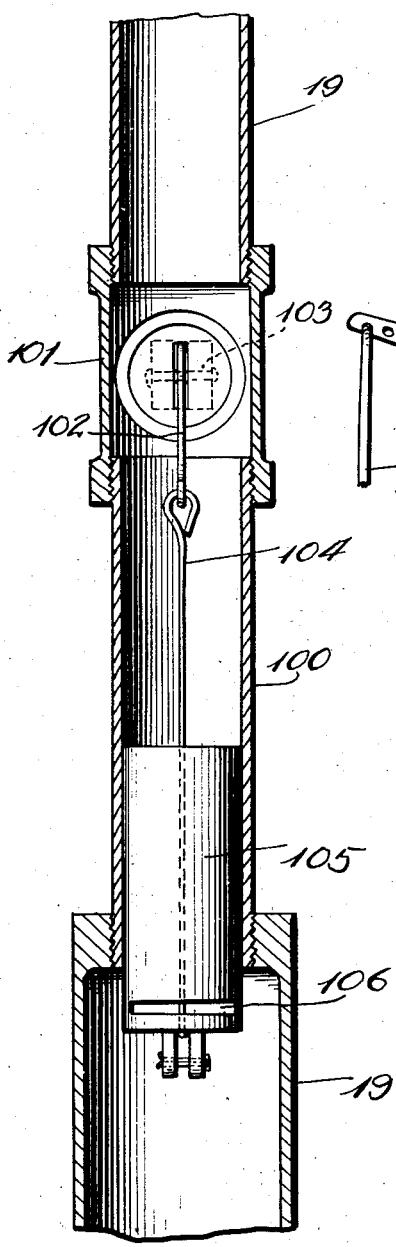
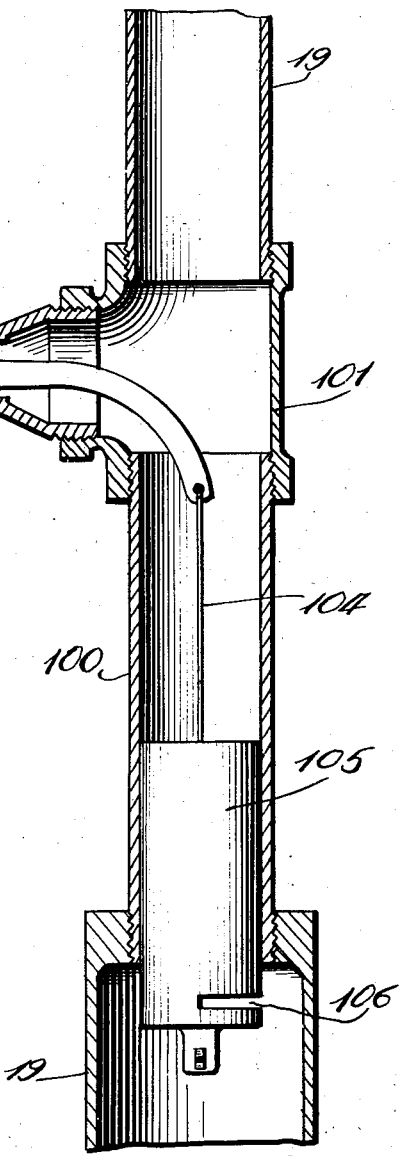
Inventor  
George W. Keck.  
By F. F. Bryant  
Attorney Patented Dec. 13, 1927.

1,652,408

UNITED STATES PATENT OFFICE.

GEORGE W. KECK, OF INDEPENDENCE, KANSAS.

SELF-SERVICE GASOLINE-PUMP ATTACHMENT.

Application filed December 10, 1926. Serial No. 153,857.

This invention relates to certain new and useful improvements in self-service gasoline pump attachments and particularly to the type embodying mechanism that is controlled in its operation by a coin inserted into the machine and embodies improvements in the art to which it relates and is of the same general character of self-service gasoline pump attachment disclosed in application filed by George W. Keck on December 31, 1925, bearing Serial Number 78,565, now Patent 1,611,199, Dec. 21, 1926.

An object of the invention is to provide a self-service gasoline pump attachment that is coin-controlled in its operation, and while gasoline is usually dispensed for a predetermined charge for each gallon, the coin-controlled mechanism of this machine is designed to be operated by dollar and half dollar coins with the mechanism regulated to deliver quantities of gasoline for half dollar and dollar values, irrespective of the price of each gallon.

Other objects include devices for the prevention of the insertion of a coin in the machine when the latter is rendered inoperative due to any cause, such as a slug or counterfeit coin being placed in the operating mechanism, devices for holding the control valve open and the coin-controlled mechanism out of use when it is desired that the gasoline be manually dispensed by an attendant, and also devices for delivering gasoline to the dispensing bowl irrespective of the amount of gasoline remaining in the dispensing bowl during operation of the coin-controlled mechanism.

With the above general objects in view that will appear as the nature of the invention is better understood, the same consists in the novel form, combination and arrangement of parts and in the details of construction hereinafter more fully described, shown in the accompanying drawings and claimed.

In the drawings, wherein like reference numerals are employed to designate corresponding parts throughout the several views, Figure 1 is a side elevational view, partly in section showing the complete installation of the self-service gasoline pump attachment;

Figure 2 is a fragmentary front elevational view showing the operating mechanism of the pump attachment;

Figure 3 is a vertical sectional view taken on line 3—3 of Figure 5 showing the rear elevation of the operating mechanism;

Figure 4 is a fragmentary elevational view, partly in section showing the air pipe extending from the compressed air tank to the auxiliary tank that delivers the gasoline to the dispensing bowl and the three way valve in the pipe for shutting off the air pressure and venting the auxiliary tank to the atmosphere;

Figure 5 is a vertical sectional view taken on line 5—5 of Figure 2 showing the registering meter interposed between the gas dispensing bowl and the delivery pipe and the shiftable magnet for extracting a false or counterfeit coin from the coin controlled mechanism;

Figure 6 is a vertical sectional view taken on line 6—6 of Figure 2;

Figure 7 is a horizontal sectional view taken on line 7—7 of Figure 5;

Figure 8 is a horizontal sectional view taken on line 8—8 of Figure 6;

Figure 9 is a horizontal sectional view taken on line 9—9 of Figure 6;

Figure 10 is a vertical sectional view taken on line 10—10 of Figure 6 showing one of the coin detector cylinders and the two coin-controlled cylinders;

Figure 11 is a fragmentary vertical sectional view showing the two coin detector cylinders in communication with the upper coin controlled cylinder;

Figure 12 is an end elevational view of the piston removed from the coin detector cylinder that receives a half dollar;

Figure 13 is a top plan view of the piston shown in Figure 12;

Figure 14 is a cross-sectional view taken on line 14—14 of Figure 13;

Figure 15 is a fragmentary end elevational view, partly in section of the two coin detector cylinders and operating mechanism associated therewith;

Figure 16 is a detailed sectional view taken on line 16—16 of Figure 7;

Figure 17 is a fragmentary elevational view, partly in section of a portion of the inner face of the mechanism casing showing the guard fingers extending over the coin slots to prevent the insertion of a coin into the machine when the mechanism is inoperative;

Figure 18 is a fragmentary sectional view of a portion of the coin detector cylinder that receives the half dollar and also showing a part of the mechanism associated therewith that is rendered operative when it is desired to dispense the gasoline to the value of a half dollar;

Figure 19 is a fragmentary elevational view, partly in section showing the operating mechanism for the magnet that extracts a false or counterfeit coin from the first coin-controlled cylinder;

Figure 20 is a vertical longitudinal sectional view of the meter and its delivery control mechanism associated therewith;

Figure 21 is a top plan view of the meter and mechanism shown in Figure 20;

Figure 22 is a front elevational view of a part of the meter mechanism;

Figures 23 and 24 are longitudinal sectional views respectively taken at right angles to each other through a portion of the overflow return pipe from the dispensing bowl to the main storage tank and showing the bucket operated by the weight of overflow gas collecting therein for shutting off the supply valve from the gasoline tank to the dispensing bowl; and Figure 25 is a fragmentary elevational view, partly in section showing devices associated with a control valve when the dispensing mechanism is associated with a gasoline pump of the type that does not have the overhead dispensing bowl.

This invention relating to self-service gasoline pump attachment includes coin-controlled mechanism for attachment to a gasoline stand pump of the type that embodies an overhead dispensing bowl or a stand pump where the gasoline is caused to be delivered directly from a storage tank to a discharge point. Briefly described, there is provided the usual underground main storage gas tank with an auxiliary tank in communication therewith and a pipe line extending from a compressed air tank to the auxiliary tank with a control valve therein. A second pipe extending from the auxiliary tank upwardly into the dispensing bowl delivers the gasoline to the dispensing bowl under the influence of air pressure while an overflow pipe extends from the dispensing bowl downwardly to the main storage tank. The coin mechanism embodies a pair of coin detector cylinders respectively receiving dollar and half dollar coins for delivering the desired coin to the first coin controlled cylinder. The operation of the first coin controlled cylinder effects opening movement of the valve in the air line for filling the dispensing bowl while the overflow of gasoline from the dispensing bowl to the main storage tank causes a reverse operation of the valve in the air line for shutting off the supply of compressed air and venting the auxiliary tank to the atmosphere. The coin in the first coin controlled cylinder is delivered to the second coin controlled cylinder and when the latter is operated the gasoline flows from the dispensing bowl through meter mechanism to a discharge hose for delivery to a customer. Devices are associated with the meter mechanism for shutting off control valves after gasoline in the amount of a half dollar or a dollar has been delivered. Fraud preventive features and other details of construction will be specifically mentioned in the following description.

The standard type of gasoline stand pump having an overhead dispensing bowl and pump mechanism associated therewith for the dispensing of gasoline is shown in Figure 1, the reference numeral 1 designating a house or shed that houses the air compressor 2 that is in pipe communication as at 3 with the compressed air storage tank 4, a check valve 5 in the pipe 3 preventing the back flow of compressed air from the tank 4 to the compressor 2. The pump stand 6 carries the overhead dispensing bowl 7 to which gasoline from the main storage tank 8 is delivered under air pressure, briefly in a manner to be now described, it being understood that the main storage tank 8 is set below the ground line 9 and is adapted to be filled through the pipe 10. The pipe 11 forming an outlet for the air compressor tank 4 has a check valve 12 therein to prevent back flow, the pipe 11 extending for a portion of its length below the ground and upwardly into the pump stand 6 as shown by dotted lines, thence downwardly as at 11ª for connection with the top wall of the auxiliary gas tank 12, the tank 12 being disposed below the main storage tank 8 and having a pipe connection 13 therewith and a check valve 14 to prevent the gasoline in the auxiliary tank 12 being forced backwardly into the main storage tank during operation of the pump mechanism. A valve casing 15, as shown in Figures 1 and 4 is interposed between the upper end of the pipe 11ª and the upper end of the pipe 11 and in which valve casing a rotatable three-way valve 16 is mounted, the valve casing having a port 17 therein that is brought into communication with two passages of the three-way valve and the pipe 11ª when the air pressure in the pipe 11 is cut off so that air in the auxiliary tank will be exhausted to the atmosphere. When the valve 16 is rotated to place the air pipes 11 and 11ª in communication, the port 17 is closed so that air under pressure flows through the pipes 11 and 11ª into the upper end of the auxiliary tank 12. The operating mechanism for the valve 16 will be later described. A pipe 18 extending into the auxiliary tank 12 through the upper wall thereof and terminating adjacent the bottom wall extends upwardly through the pump stand 6 and empties into the dispensing bowl 7, gasoline being forced upwardly through the pipe 18 under air pressure while the overflow of gasoline in the dispensing bowl 7 flows downwardly through the pipe 19 to be returned to the main storage tank 8.

The self-service gasoline pump attachment 20 diagrammatically illustrated in Figure 1 includes coin-control mechanism for rendering certain control valves operative, and said attachment 20 includes a registering meter 21 shown by dotted lines in Figure 1 through which gasoline flows from the dispensing bowl 7 through the medium of the dispensing pipe 22, a delivery hose 23 being connected to the outlet end of the meter 21 whereby gasoline may be delivered to the customer.

The gasoline pump attachment 20 as shown in Figure 1 is attached to one side of the upper end of the pump stand 6 below the dispensing bowl 7 and said attachment comprises a casing that incloses the coin-controlled mechanism and has a front wall 24, end walls 25 and 26, a rear wall 27, top wall 28 and a bottom wall 29. This casing incloses the coin-control mechanism and is spaced from the pump stand 6 by the second casing 30, shown in Figure 1 as inclosing the meter 21 and certain parts of the coin-controlled mechanism disposed rearwardly thereof.

Figure 6:
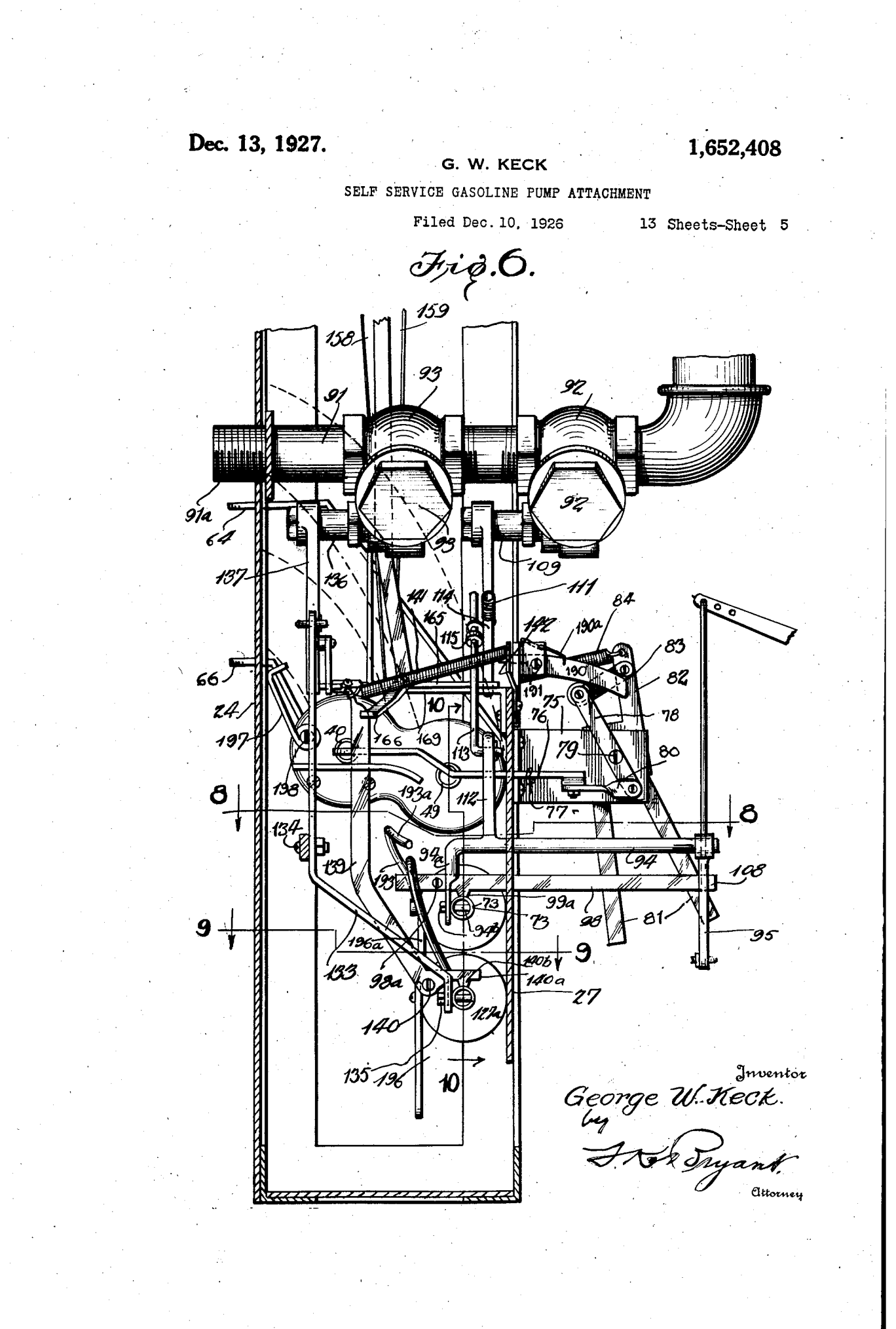

The description of the construction and operation of the coin-control mechanism and its associated parts will follow the insertion of a coin into the machine and its passage therethrough and as shown in Figures 2 to 7 and 11 a pair of coin-receiving detector cylinders 31 and 32 is illustrated, the cylinder 31 being of a size to receive a dollar coin while the cylinder 32 is of a size to receive a half dollar coin. Separate coin chutes 33 extend from the front wall 24 of the casing to the upper sides of the cylinders 31 and 32 and communicate with coin receiving slots 34 in said detector cylinders. A dollar coin is inserted into the chute 33 that leads to the cylinder 31 for dispensing one dollar's worth of gasoline while a half dollar coin is inserted in the chute 33 that delivers the coin to the cylinder 32 for dispensing a half dollar's worth of gasoline. As the two coin receiving and detector cylinders 31 and 32 are of similar construction, like reference numerals will be employed in referring to the same. Each of the cylinders 31 and 32 has a reciprocating piston comprising the two parts 35 and 36 shown in detail in Figures 12 to 14, the two parts of the piston being connected by the side rib 37 that extends through and is slidable in a slot in the side wall of the associated cylinder.

As shown in Figure 10 the space 38 between the two parts 35 and 36 of the piston registers with the coin slot 34 when the piston is fully retracted and said piston being spring pressed in a manner to be described, in one direction, movement thereof is limited by the rib 37 engaging one end of the slot through which the same extends. The inner end of each cylinder is closed by the screw cap 39 that has a central opening therein through which the tubular shaft 40 carried by the piston section 35 extends, a coiled spring 41 surrounding the tubular shaft 40 between the end cap 39 and piston section 35. The other piston section 36 has a recess 42 opening at its outer end, the outer end of the recess 42 being enlarged and internally threaded for the reception of end disk 43. A pin 44 extending through the end disk 43 and projecting slightly outwardly thereof as shown in Figure 10 extends through the recess 42 and the bottom wall of said recess for slight projection into the coin slot 38 between the two sections of the piston when said piston is operated, the forward end of the pin 44 being normally retracted out of the coin slot 38 by the spring 45 engaging the bottom wall of the recess 42 and the annular block fixed to the pin within said recess, the coiled spring 45 inclosing the pin as illustrated.

As shown in Figures 10 and 11 the lower sides of the cylinders 31 and 32 are cut away as at 47, the cut away portion extending from the outer side of the coin slot 38 to a point beyond the piston section 35 while the opposite edges of the cut away portion carrying inwardly directed lugs 48 that extend into the bore of the cylinder within the coin slot 38. The piston section 36 is longitudinally grooved as at 49 to accommodate the lugs 48 when the piston is reciprocated. It will therefore be seen that if a coin of a size smaller than what is required is used in the particular cylinder, the coin will pass through the coin slot 38 and delivery thereof to the next cylinder of the series is eliminated. If the coin is of the proper size, the movements thereof will be arrested and the same will be supported by the lugs 48 within the coin slot.

The operating mechanism for the two part piston being shown more clearly in Figures 2, 7, 10 and 16 comprises for each piston a bracket 50 supporting a lever 51 that has pivoted to its lower end as at 52 a rod 53, the bracket 50 and lever 51 being mounted exteriorly of the attachment casing with the rod 53 extending through the end wall 25 of the casing. The rod 53 extends inwardly of the casing and terminates at a point inwardly of the forward end of the adjacent coin detector cylinder and has an arm 54 fixed thereto adjacent the inner side of the end wall 25 of the casing to the other end of which arm a rod 56 is fixed, a cam 57 being pivotally supported in the forked end 56ª of the rod 56. The inner end of the cam that is associated with the half dollar cylinder is pivotally supported at 58 adjacent the inner end of the cylinder upon the bracket 59 that is carried by a wall of the casing while the cam 57 associated with the dollar cylinder 31 is pivotally supported as at 60 upon the bracket 61 carried by the end of the cylinder 31.

A coin of either a dollar or half dollar denomination is inserted into the proper chute 33 for delivery to the desired cylinder 31 or 32 and said coin being received in the slot 38 between the two piston sections 35 and 36 is retained therein by the opposite lugs 48 engaging the periphery of the coin at spaced points below its transverse median line. The proper coin being so supported is to be delivered to a coin control cylinder and to effect this delivery of the coin, the two part piston is moved in the coin detector cylinder against the tension of the spring 41. The piston is moved by the lever 51, rod 53 and rod 56, the rod 53 moving below its associated cylinder while the rod 56 operates the cam 57 to move the same into engagement with the outer end of the piston. As shown in Figure 10, the spring pressed pin 44 is arranged in the path of movement of the cam 57 and said pin is first projected a slight distance into the coin slot 38 for gripping the coin therein. Continued movement of the rod 56 and cam 57 will move the piston through the cylinder while the pin 44 engaging the coin and cooperating with the adjacent face of the piston section 35 for frictionally retaining the coin therein prevents discharge of the coin from the cylinder until the coin has passed to a point beyond the supporting lugs 48. Continued movement of the piston will move the coin to a position in line with the discharge slot 62 in the lower side of the cylinder and at this time, the cam 57 will have passed its peak of activity to permit a slight retraction of the pin 44 to free the same from engagement with the coin and to permit the coin to drop through the discharge slot 62 into the chute 63. In this connection, attention is called to Figure 11 which shows the two coin detector cylinders discharging into the single chute 63 that is in communication with the first coin control cylinder.

Devices are provided for detecting a false or counterfeit coin or slug, and if a thin slug is inserted into either of the coin detector cylinders 31 or 32, the same will be temporarily supported upon the lugs 48 but would not be engaged by the pin 44 so that when the piston was moved forwardly in the cylinder, the thin slug would be moved off the supporting lugs 48 and would drop from the detector cylinder through the relatively wide cut-away portion 47 in the lower side thereof. In the event that a slug in the form of a washer is inserted in the machine, the pin 44 would be projected into the central opening of the washer and when the piston is moved to dispose the washer laterally of the supporting lugs 48, the washer would partly drop through the opening 47 and be suspended upon the pin 44 but would be prevented from travelling to the discharge slot 62 and chute 63. With the mechanism of the detector cylinder in this condition, it would be impossible to work the same and to effect removal of the slug, each of the coin detector cylinders has associated therewith a lever that is manually operable to effect limited vibratory movements of the pistons to cause dis-engagement or dis-lodgment of the slug and the restoration of the mechanism to its operative condition. As shown in Figures 5 and 7, a lever 64 arranged at an inclination as shown is pivotally supported at its inner lower end upon the pin 60 while its upper end extends through a horizontal slot in the front wall 24 of the casing. A lever 64 carries a finger 65 upon one side thereof that engages the piston in the cylinder 31 as shown in Figure 7. The lever 66 having one end thereof extending through a slot in the front wall 24 of the casing is associated with the cylinder 32 and being pivotally supported upon the pin 58 has the end 67 thereof moved into engagement with the piston in the cylinder 32 for imparting vibratory reciprocatory movements to the piston to free the cylinder 32 of a counterfeit coin or slug.

The coin discharged from either of the cylinders 31 or 32 into the chute 63 passes through the coin slot 68 in the upper side of the first coin control cylinder 69 and is received in the space 70 between the centrally apertured bearing block 71 in said cylinder 69 and the centrally apertured piston 72. The forward end of the cylinder 69 is closed by the plug 69ª which plug is centrally apertured and through which the tubular piston rod 73 carried by the piston 72 extends, a coiled spring 74 surrounding the tubular piston rod 73 between the end closure 69ª and piston 72.

Should a false or counterfeit coin be of a nature to permit delivery thereof into the coin control cylinder 69, it is still possible to extract the false or counterfeit coin from the cylinder 69 before any of the gasoline control valves are operated and immediately upon its delivery to the coin controlled cylinder and said devices are shown more clearly in Figures 6 and 19. As shown in Figure 6, a bracket 75 is carried by the outer side of the rear casing wall 27. In proximity of the bracket 75 the lever 76 is pivotally supported upon the wall 27 as at 77, the lever 76 extending through a slotted opening in the casing wall 27 and being of angle formation to extend in the path of movement of the tubular piston rod 40 of the coin detector cylinders 31 and 32. A lever 78 is pivotally supported as at 79 upon the bracket 75 and has a link connection 80 with the adjacent end of the lever 76. A horseshoe magnet 81 carries a head portion 82 that has a link connection 83 with the other end of the lever 78 while a coiled spring 84 extending between the casing wall 27 and upper end of the magnet head 82 normally moves the lower end of the magnet away from the casing wall 27 and coin control cylinder 69. As shown in Figure 19, one side of the coin control cylinder 69 is cut away as at 85 to form a coin extraction slot that registers with a slotted opening 86 in the casing wall 27. It will therefore be seen that when either of the piston rods 40 in the coin detector cylinders is projected, the lever 76 will be operated or moved upon its pivotal support 77 and through its link and lever connection with the horseshoe magnet 81 will move the lower end of the magnet into the casing wall slots 86 and coin extraction slot 85 in the coin control cylinder 69 so that when either of the pistons in the coin detector cylinders is retracted, the spring 84 will swing the magnet away from the casing wall 27 and remove the false coin from the coin control cylinder 69.

It is now to be assumed that a proper coin such as a dollar or half dollar has been delivered to the coin space 70 in the coin control cylinder 69 and said coin control cylinder has a plunger rod 87 extending into the central aperture of the end bearing block 71 of said cylinder while the outer end of the plunger rod having a handle thereon extends through the side wall 25 of the casing. A coiled spring 88 inclosing the plunger rod 87 between the end bearing block 71 and the casing wall normally retains the plunger rod in its retracted position. With a coin in the cylinder 69 there is an abutment for the plunger rod for moving the piston 72 in the cylinder 69 and projecting the tubular piston rod 73 outwardly of the cylinder, such movement being limited by the button 89 shown more clearly in Figures 2 and 11 that is carried by the piston 72 and extends through the slot 90 in the side wall of the coin cylinder 69.

As shown in Figure 1, the gasoline in the dispensing bowl is delivered to the customer through the outlet pipe 22 communicating with the dispensing bowl that leads to the meter 21 and interposed between the meter 21 and the discharge hose 23 is the pipe section 91 shown more clearly in Figures 5 and 6 and having a threaded end 91ª to which the delivery hose 23 is connected. The pipe section 91 has a pair of spaced valves 92 and 93 set therein and in normally closed position to prevent the flow of gasoline from the dispensing bowl 7 to the hose 23, devices being provided and rendered operable upon projection of the piston rod 73 in the coin control cylinder 69 for opening the valve 92 to permit the flow of gasoline from the dispensing bowl to the closed valve 93, other devices being associated with the tubular piston rod 73 for operating the valve 16 in the air line 11 and 11ª as shown in Figures 1 and 4 for forcing gasoline under pressure from the auxiliary tank 12 upwardly through the pipe 18 and into the dispensing bowl 7. The mechanism for operating the air control valve 16 will be first described.

As shown in Figure 6, a rock shaft 94 is journaled in the rear casing wall 27 at a point above the coin cylinder 69 and carries at its inner end a right-angular depending arm 94ª that is pivotally connected at its lower end as at 94ᵇ to the projecting end of the piston rod 73. The other end of the rock shaft 94 outwardly of the casing has an arm 95 fixed thereto at one of its ends with the lower free end of the arm 95 having a link rod connection 96 with the valve handle 97 attached to the rotary three-way valve 16 in the air pipe line. It will therefore be seen that when the piston rod 73 is projected, the devices connecting the piston rod with the valve 16 will cause the valve to be moved from the full line position shown in Figure 4 to the dotted line position and at which time air under pressure is permitted to flow from the compressed air tank 4, shown in Figure 1 through the pipe 11, pass through ports in the valve 16 and downwardly through the pipe 11ª to the upper end of the auxiliary tank 12, the gasoline in the tank 12 being forced under air pressure upwardly through the pipe 18 and into the bowl 7. The valve 92 having been opened during this movement of the rock shaft 94 by devices to be presently described, permits the gasoline in the dispensing bowl 7 to flow through the pipe 22, meter 21, through said valve 92 to be stopped by the valve 93. Devices are provided for holding the piston rod 73 projected to insure filling of the dispensing bowl 7 and include a latch arm 98 traversing the closed forward end of the cylinder 69 and pivotally supported thereon as at 98ª, the upper side of the tubular piston rod 73 having a notch 99 therein to receive the lug 99ª on the lower edge of the latch arm 98 that is of a length to cause the outer end thereof to be gravitationally lowered to insure reception of the lug 99ª being received in the notch 99. The piston rod 73 being retained in its projected position by the latch arm 98, the air valve 16 is held in its open position with the gasoline flowing into the delivery bowl 7. The gasoline continues to flow into the delivery bowl 7 until the same reaches the height to enter the overflow return pipe 19 that extends downwardly to the main storage tank 8, devices being arranged in the overflow return pipe 19 to effect the elevation of the outer end of the latch arm 98 to release the same from the projected piston rod 73 and to permit the spring 74 to retract the piston rod for reverse rotation of the rock shaft 94 and through the medium of the connections between the rock shaft 94 and the valve handle 97 close the valve 16 to shut off the flow of air therethrough as shown in full line position in Figure 4. With the valve 16 so disposed the compressed air remaining in the auxiliary tank 12 and pipe 11ª is permitted to exhaust to the atmosphere through the vent 17 in the valve casing 15 so that gasoline in the main storage tank 8 may flow through the pipe 13 by way of the check valve 14 into the auxiliary tank.

The devices for releasing the latch arm 98 from the piston rod 73 are shown more clearly in Figures 6, 23 and 24. The return pipe section 19 is connected to the pipe 100 by the connector 101 and said connector has an open side through which a lever 102 extends that is pivotally supported as at 103. The inner end of the lever 102 has a rod connection 104 with the bottom wall of a bucket 105 that is open at its upper end and said bucket 105 is of a size to contact the inner face of the pipe 100 but to be freely slidable therein. The side wall of the bucket 105 adjacent its lower end is provided with a horizontal arcuate slot 106 that is aligned with the pipe 100 when the bucket 105 is elevated to form a closure, descending movement of the bucket 105 due to the reception of gasoline therein caused by overflow from the dispensing bowl 7 into the pipe 19 causes lowering movement of the bucket with the latter assuming the position shown in Figures 23 and 24 and at which time the contents of the bucket are discharged into the lower end of the return pipe 19. The outer end of the lever 102 has a depending link rod connection 107 with the outer end of the latch arm 98 shown at 108. It will therefore be seen that with gasoline returning to the main storage tank 8 through the overflow pipe 19, the same will be received into the bucket 105 and by the weight thereof will lower the bucket for discharging the contents and move the lever 102 upon its pivotal mounting 103, elevating the outer end of the latch arm 98 to disengage the lug 99ª from the notch 99 in the piston rod 73. It will now be seen that upon operation of the piston 72 in the first coin control cylinder 69 in the presence of a coin will cause opening movement of the valve 16 to permit gasoline to be forced under air pressure into the dispensing bowl 7 while the overflow of gasoline from the dispensing bowl and return thereof to main storage tank will effect closing movement of the air valve. The devices for opening the valve 92 being operated upon projection of the piston rod 73 will now be described.

The valve 92 being of the rotary type comprises a stem 109 projecting outwardly of the valve casing and to which a valve handle 110 is fixed, the valve 92 being normally retained in its closed position by the spring 111 shown in Figures 2 and 6 attached at one of its ends to the valve handle and at its other end to a side wall of the casing. A perpendicular arm 112 is carried by the rock shaft 94 and extends in a direction opposite to the depending arm 94ª and the upper free end of the arm 112 pivotally supports and retains the bent end of a push rod 113. An apertured lug 114 rigid with one side of the valve handle 110 has the free end of the push rod 113 freely extending therethrough, an abutment 115 fixed to the push rod adapted for engagement with the lug 114 for moving the valve handle 110 upon rotation of the rock shaft 94. The valve handle 110 being normally retained in its closed position by the spring 111, devices are provided for holding the valve handle 110 in its shifted position as moved by the push rod 113 with the valve 92 open and said devices are shown more clearly in Figures 5 and 19.

A bracket 116 is carried by the casing wall 27 upon the inner side thereof and in a plane above the bracket 75 upon the outer side of said wall and said bracket 116 has a catch 117 pivoted thereto as at 118, a wire spring 119 being carried by the bracket 116 upon the pin 120 has one end thereof engaging the pin 121 at the outer end of the catch for moving the outer end downwardly and the inner end upwardly. The inner end of the catch 117 is bifurcated to provide spaced fingers 122 between which the pin 123 carried by the bracket 116 extends for limiting upward movement of the inner end of the catch. The lower end of the valve handle 110 is notched to escape the upper finger 122 when the valve handle is being shifted to its open position and when positioned rearwardly of said finger, the spring 119 elevates the bifurcated end of the catch to engage the end of the valve handle 110 to retain the same in its shifted position and the valve 92 open. When the piston 72 in the cylinder 69 is projected by the presence of a coin in the slot 70, the coin is moved to a position to overlie the discharge slot 124 in the lower side of the cylinder 69 at the same time that the tubular piston rod 73 is retained in its forwardly projected position. When the plunger rod 87 is retracted by the spring 88, pressure on the coin is relieved and the latter drops through the coin slot 124 and is guided by the chute 125 delivered into the coin space 126 in the second coin control cylinder 127. The forward end of the coin control cylinder 127 has the bearing block 128 fixed therein and centrally apertured for the passage of the plunger rod 129 that projects through the wall of the casing as shown in Figure 2 and is retained in its retracted position by the coil spring 130 enclosing the same. The coin control cylinder 127 has the reciprocating piston 131 mounted therein with the tubular piston rod 132 projecting through a central opening in the end wall 127$^a$ of said cylinder, the piston being influenced in one direction by the spring 127$^b$. Connections are provided between the tubular piston rod 132 of the coin cylinder 127 and the valve 93 to effect opening movement of the valve upon projection of the piston 132 and are shown more clearly in Figures 2, 6 and 10.

An angle lever 133 is pivotally supported upon the bracket 134 carried by the casing and has a pin and slot connection 135 at its lower end with the tubular piston rod 132. The valve 93 being of the rotary type has a laterally projecting stem 136 that carries a valve handle 137 upon its outer end while, as shown in Figure 2, a link 138 extends between the upper end of the angle lever 133 and the valve handle 137. It will therefore be seen that when a coin is present in the slot 126 in the coin cylinder 127, the piston 131 will be projected for opening the dispensing valve 93, it being understood that the valve handle 110 for the valve 92 is still retained in its open position by the catch 117 shown in Figure 19 that is engaged by the valve handle 110. There being a positive connection between the tubular valve rod 132 and the valve handle 137, devices are provided for holding the piston rod 132 in its projected position with the valve 93 retained open for the dispensing of the gasoline.

As shown in Figure 6, a relatively long vertical lever 139 is pivotally supported adjacent its lower end as at 140 upon the end wall 127$^a$ of the coin cylinder 127 and has the lower end 140$^a$ thereof overlying the tubular piston rod 132 and carrying upon its lower edge a lug 140$^b$ that is adapted to be received in the notch 132$^a$ in the upper side of the tubular piston rod 132 when the latter is projected, the lower end 140$^a$ of the lever 139 being moved toward the tubular piston rod 132 by the spring 141 extending between the upper end of the lever 139 and bracket 142 carried by the rear wall 27 of the casing. When the piston 131 is projected in the cylinder 127 and is so retained by the lever 139, retraction of the plunger rod 129 under the influence of the spring 130 will relieve pressure of the plunger rod on the coin in the space 126 and permit the coin to drop through the discharge slot 143 in the lower side of the cylinder 127 and into a coin box or other receptacle. The coin has now travelled completely through the machine and in doing so has brought about the filling of the dispensing bowl 7 and the opening of the valves 93 and 92 for the delivery of gasoline through the hose 23 to the customer. It will be noted from an inspection of Figures 2 and 11 that the piston 131 in the coin control cylinder 127 carries a lateral button 131$^a$ projecting through a side slot 127$^c$ in the side of the cylinder 127 for limiting movement of the piston. It having been previously stated that the machine is to be operated by the depositing therein of either dollar or half dollar coins for the purchase of a corresponding quantity of gasoline, and it also having been stated that the gasoline in outletting from the dispensing bowl 7 flows through the meter 21, the meter and parts directly associated therewith will now be described.

As shown in Figures 2, 5, and more particularly Figures 20 to 22 the meter casing 21 includes a rotary impeller over which the gasoline flows in passing to the valve 92 and 93 and said impeller effects rotation of the shaft 144 that is journaled in the wall 145 and through a train of speed reducing gearing rotates the shaft 146 that is journaled in the wall 145 and dial plate 147, the end of the shaft 146 projecting forwardly of the dial plate 147 carrying a cone clutch element 148. A bracket embodying a horizontal shelf 149 has the end angle portion 149$^a$ thereof secured to the lower portion of the dial plate 147 while the other end of the shelf portion of the bracket carries an upstanding perpendicular leg 149$^b$ through which the extension 146$^a$ of the shaft 146 rotatably extends. The shaft 146 and its extension 146$^a$ are journaled in the wall 145, dial plate 147 and leg 149$^b$.

An externally threaded sleeve 150 is freely rotatable upon the shaft extension 146$^a$ and carries at one of its ends a cone clutch element 151 that cooperates with the cone clutch element 148 for locking the sleeve 150 to the shaft extension 146$^a$, the cone clutch element 151 carrying an indicator finger 151$^a$ moving over graduations 147$^a$ on the dial plate 147. A disk wheel 152 is fixed to the externally threaded sleeve 150 substantially midway the ends thereof and carries a radially directed finger 152$^a$ upon the periphery thereof that moves into engagement with the shelf portion 149 of the bracket to act as a stop in a manner and for purposes presently to appear. A pair of disk wheels 153 and 154 is loosely supported upon the sleeve 150 at opposite sides of the disk wheel 152 and being rotarily adjustable upon said sleeve or retained in adjusted positions by the jamb nuts 155. Outwardly directed lateral lugs 153$^a$ and 154$^a$ are respectively carried by the disk wheels 153 and 154 for purposes presently to appear. A U-shaped frame 156 has upright end legs 156$^a$ and 156$^b$ that are loosely supported at their upper ends upon the sleeve 150 and the follower gland 157 loose upon the shaft extension 146$^a$. A coiled spring 158 encloses the shaft 146$^a$ between the end leg 149$^b$ and the follower gland 157 for normally influencing the externally threaded sleeve 150 and its cone clutch element 151 together with the bracket 156 toward the cone clutch element 148, frictional contact being present between the abutting ends of the externally threaded sleeve 150 and the follower gland 157 and when the clutch elements 148 and 151 are engaged the externally threaded sleeve 150 and parts associated therewith with the exception of the bracket 156 are rotatable with the shaft extension 146$^a$. The gasoline flowing through the meter casing 21 for delivering through the discharge pipe 23 to the customer effects rotation of the meter shaft 146 and shaft extension 146$^a$ and the rotation of the disk wheels 152, 153 and 154. It has been stated that the disk wheels 153 and 154 are rotarily adjustable and so retained upon the sleeve 150 and also rotarily adjustable with respect to the disk wheel 152 which is stationarily mounted upon said sleeve, and it also having been stated that the valves 92 and 93 are adapted to be closed after gasoline in the value of either a dollar or half dollar has been delivered, devices are provided between the disk wheels 153 and 154, and the pivoted catch 117 shown in Figure 19 to effect release of the valve handle 110 that is retained in its open position to permit closing movement of the valve 92. For purpose of clarity, it will be understood that the disk wheel 153 controls the dispensing of a dollar's worth of gasoline while the disk wheel 154 controls the dispensing of a half dollar's worth of gasoline.

As shown in Figures 3, 19 and 20 a pair of spaced rods 158 and 159 are connected at their lower ends to the end pin 121 upon the catch 117 with the upper ends thereof extending through openings in the shelf portion 149 of the bracket carried by the dial plate 147 with the upper ends thereof bent to provide hooks 158$^a$ and 159$^a$ respectively. Both rods 158 and 159 are employed for releasing the valve handle 110 to shut off the valve 92 and the upper end of the rod 159 being normally inoperatively positioned, the manner of shutting off the valve 92 when a dollar's worth of gasoline has been dispensed will now be described. There will also be now described the manner of rotarily adjusting the disk wheels 153 and 154 with respect to the cone clutch element 151.

When the two valves 92 and 93 are in closed positions, the clutch elements 148 and 151 are separated and a part of the mechanism for separating the two clutch elements which is shown in Figure 20 comprises a lever 161 that is pivotally supported at 161$^a$ upon the arm 162 depending from the shelf of the bracket 149 with the upper end 161$^b$ of the lever 161 engaged with the leg 156$^b$ of the U-shaped frame 156 for moving the frame 156 and sleeve 150 against the tension of the spring 158 toward the bracket arm 149$^b$. The externally threaded sleeve 150 is provided with a plain portion 150$^a$ at the end thereof adjacent the clutch element 151 and which extends through the bracket leg 156$^a$ so that in the initial shifting movement of the U-shaped frame 156, the follower gland 157 is first disengaged from the end of the sleeve 150 and continued movement of the U-shaped bracket will cause the leg 156$^a$ thereof to engage the threaded portion of the sleeve and shift the same. As stated, the U-shaped frame with the clutch element 151 and disk wheels confined thereby are unitarily moved away from the clutch element 148.

To adjust the meter mechanism so that gasoline to the value of one dollar will be dispensed, the jamb nut 155 adjacent the disk wheel 153 is loosened to permit free rotation of the disk wheel 153 upon the sleeve 150. The disk wheel 152 is fixed to the sleeve and under rotary tension in one direction by the spring 160 which is limited by the stop pin 152$^a$ engaging the shelf of the bracket 149 is rotated by hand to position the indicator finger 151$^a$ carried by the clutch element 151 with respect to the graduations 147$^a$ upon the dial plate 147. The disk wheel 153 is then manually rotated to cause the lug 153$^a$ projecting laterally therefrom to engage the hook 158$^a$ upon the upper end of the rod 158 and raise the hook for operating the catch 117. When this has been accomplished, the jamb nut 155 is tightened and the disk wheel 153 retained in its adjusted position. The strain upon the disk wheel 152 is then relieved and the sleeve 150 is permitted to be rotated in a reverse direction under the influence of the spring 160 and until the stop pin 152$^a$ engages the bracket 149. The disk wheel 154 is adjusted in a similar manner for dispensing a half dollar's worth of gasoline and it having been previously stated that the hook 159$^a$ upon the upper end of the rod 159 was out of the path of movement of the lug 154$^a$ upon the disk wheel 154 and so retained by the arm 163 that is pivotally supported upon the stud 164 carried by the bracket 149 and through one end of which arm 163 the upper end of the rod 159 extends. The upper hooked end of the rod is manually moved into the path of movement of the lug 154$^a$ upon the disk wheel 154 and with the jamb nut 155 adjacent said disk wheel loosened, the indicator finger 151$^a$ upon the clutch element 151 is again adjusted over the dial graduations 147$^a$ to a point indicating a half dollar's worth of gasoline. When so disposed, the disk wheel 154 is rotated to cause the lug 154$^a$ thereof to engage the hook 159$^a$ to vertically shift the rod 159 and move the catch 117 upon its pivot and at which time the wheel 154 is so retained by adjustment of the jamb nut 155.

It is to be assumed that the lever 161 has been moved upon its pivotal mounting 161$^a$ to permit the spring 158 to move the clutch element 151 into engagement with the clutch element 148 and with gasoline flowing through the meter 21, the shaft 146 and extension 146$^a$ are rotated. During rotation of the shaft extension with the disk wheel 153 fixed thereto by the jamb nut 155, the lug 153$^a$ upon the wheel 153 is moved into engagement with the hook 158$^a$ upon the upper end of the rod 158 and when the rod 158 is elevated by said lug, the catch 117 is moved upon its pivot 118, as shown in Figure 19 to disengage the notched end of the valve handle 110 from the bifurcated leg 122 of said catch to permit closing movement of the valve 92 which is occasioned by the spring 111 moving the valve handle 110. The valve 93 at this time being also open due to the projection of the tubular piston rod 132 that is retained in its open position by the lug 140$^b$ upon the lever 139 as shown in Figure 6, devices are arranged in the path of closing movement of the valve handle 110 for shifting the lever 139 to free the piston 132 and permit retraction thereof by the spring 127$^b$ associated with the piston 131 in the coin cylinder 127, the lever and link connection between the piston 132 and valve handle 137 for the valve 93 causing the valve 93 when the piston rod 132 is retracted to be closed.

The devices for accomplishing this function include a lever of spider formation comprising three legs 165, 166 and 167 that are pivotally supported as at 168 upon the bracket 169 as shown in Figures 6 and 7, the leg 165 of the spider lever being arranged in the path of closing movement of the valve handle 110 as shown in Figure 7 for moving the leg 166 into engagement with the upper end of the lever 139 to remove the lug 140$^b$ from the piston rod notch 132$^a$. Retraction of the piston rod 132 as previously stated causes movement of the valve handle 137 to close the valve 93.

The lower end of the lever 161 has a pin connection 169$^a$ with the outer end of the spider lever leg 167 to cause the upper end of the lever 161 to move upon its pivot 161$^a$ for shifting the U-shaped frame 156 of the meter mechanism for disengaging the clutch elements 148 and 151. It will therefore be seen that when gasoline to the value of one dollar has been delivered through the meter, the two discharge valves 92 and 93 are closed and the clutch devices of the meter mechanism separated. The hook 158$^a$ at the upper end of the rod 158 is always in the path of movement of the lug 153$^a$ upon the disk wheel 153, but, as before stated, the hook 159$^a$ upon the upper end of the rod 159 is normally out of the path of movement of the lug 154$^a$ upon the wheel 154 and devices are associated with the arm 163 through one end of which arm the rod 159 extends for shifting the hook 159$^a$ into the path of movement of the lug 154$^a$. The devices for shifting the arm 163 are shown more clearly in Figures 5 and 18. As shown in Figure 13, the upper side of the two piston parts 35 and 36 in the coin detector cylinder 32 is longitudinally grooved as at 170 and into which groove the lower beveled end 171 of a lever 172 that extends through a slot 32$^a$ in the upper side of the cylinder 32 is received. The lever 172 is pivotally supported intermediate its ends upon the bracket 173 while the extreme upper end of the lever 172 is pivotally connected to the outer end of the arm 163. When a half dollar coin is received in the coin space 38 between the two piston sections 35 and 36 in the cylinder 32 as shown in Figure 18, projection of the piston carrying the coin will cause the latter to engage the lower beveled end 171 of the lever 172 for shifting the latter upon its pivotal end at 173 and cause pivotal movement of the arm 163 upon the stud 164 to move the hook 159$^a$ upon the upper end of the rod 159 into the path of movement of the lug 154$^a$ carried by the disk wheel 154. The lever 172 as shown in Figure 2 is spring pressed as at 174 adjacent its pivotal mounting to normally influence the lower beveled end 171 toward the rear end of the cylinder 32 with the arm 163 shifted to displace the hook 159$^a$ from the path of movement of the lug 154$^a$. A latch device is provided for holding the lower end of the lever 172 in its shifted position as moved by the coin and said latch being more clearly shown in Figures 7 and 18 comprises an angle lever of bell crank formation pivotally supported as at 175 upon the bracket 176 on the upper side of the cylinder 32 with the leg 177 extending longitudinally of the cylinder and having a hook 177$^a$ upon the end thereof. The other leg 178 of the bell crank lever extends in the path of movement of the valve handle 137. The spring 179 associated with the latch lever tends to move the hook end 177$^a$ thereof into the path of movement of the lever 172. When the lower end of the lever 172 is moved forwardly by the coin the same wipes over the hook end 177$^a$ of the bell crank latch and is prevented from return movement by the hook 177$^a$ engaging rearwardly of the lever 172. In this manner, the hook 159$^a$ upon the upper end of the rod 159 is held in the path of movement of the lug 154$^a$ upon the disk wheel 154. As shown more clearly in Figure 18, the free end of the valve handle 137 for the valve 93 carries a tensioned latch 180 upon one side thereof that is stopped in its movement by the pin 181 and when the valve handle 137 is moved to its open position by the tubular piston rod 132, the tensioned latch 180 wipes over the leg 178 of the bell crank latch to uneffect the same. However, during closing movement of the valve handle 137 the tensioned latch 180 engages the leg 178 of the bell crank catch for shifting the same upon its pivotal mounting 175 to disengage the hook end 177$^a$ of the latch leg 177 from the path of movement of the lever 172 to permit movement of said lever under the influence of the spring 174 and which movement displaces the hook 159$^a$ laterally of the disk wheel lug 154$^a$. Although the hook 158$^a$ upon the upper end of the rod 158 constantly remains in the path of movement of the lug 153$^a$ upon the disk wheel 153, said lug and hook are not engaged with each other when the hook 159$^a$ is moved into the path of movement of the lug 154$^a$ as the lug 154$^a$ moves a shorter distance than the lug 153$^a$ in operating the hook 159$^a$ for dispensing a half dollar's worth of gasoline.

Should the latch arm 177 fail to become disengaged from the lever 172 upon closing movement of the valve handle 137 and with the hook 159$^a$ still in the path of movement of the lug 154$^a$ and so positioned to cause the valves 92 and 93 to be shut off after the dispensing of a half dollar's worth of gasoline, and the next customer insert a dollar coin into the machine, additional devices are associated with the lever 177 to ensure disengagement thereof from the lever 172 upon the operation of the plunger rod 53 associated with the cylinder 31. Assuming that the latch arm 177 is engaged with the lever 172 and the plunger rod 53 for the cylinder 31 is forwardly projected, the forward end of the plunger rod 53 as shown in Figures 7 and 15 is engaged with one end of the lever 182 that is pivotally mounted upon the bracket 183 and said lever being of angle formation has the hook 184 upon the upper end thereof disposed at one side of the latch arm 177 for moving the latch arm upon its pivotal support 175 for laterally shifting the same to ensure disengagement of the hook 177$^a$ from the lever 172. In this way it will be assured that a dollar's worth of gasoline will be delivered while the disk wheel 154 and rod 159 will remain inoperative.

As shown in Figure 17, the coin chutes 33 leading to the cylinders 31 and 32 extend to the front wall 24 of the casing and communicate with coin slots 33$^a$ and 33$^b$. A guard arm 185 is associated with each slot 33$^a$ and 33$^b$, the same being pivotally supported at 185$^a$ upon the inner side of the front wall 24 of the casing and spring pressed as at 185$^b$ for normally forcing an end thereof over the coin slot when the pistons in the coin detector cylinders 31 or 32 are projected. As shown in Figure 7, the connecting rib 37 for the two piston sections 35 and 36 carries an outwardly directed pin 186 that is normally engaged with the lower end of the guard arm 185 associated with the arm slot 33$^b$ so that when the piston is retracted into the forward end of the cylinder the upper end of the guard arm is spaced laterally of the coin slot 33$^b$. After a coin has been inserted in the slot 33$^b$ and the piston in the cylinder 32 projected, the pin 186 carried by the piston rib 37 is moved out of engagement with the guard arm 185 to permit the spring 185$^b$ thereof to move the upper end of the guard arm over the slot 33$^b$ to prevent the insertion of another coin. It will therefore be seen that should a false or counterfeit coin be inserted in the cylinder 32 with the piston therein retained in its forwardly projected position with the operating mechanism incapable of functioning, it will be impossible to insert another half dollar coin in the slot 33$^b$.

As shown in Figures 5, 7 and 17 a lever 187 is pivotally supported as at 188 upon the casing wall 27 and has the lower end thereof disposed in the path of movement of the connecting rib 37 for the two part piston in the cylinder 31, the upper angle end 187$^a$ of said lever 187 having a pin connection 189 with the lower end of the guard arm 185 that is associated with the coin slot 33$^a$. The spring 185$^b$ has a tendency to move the guard arm 185 over the slot 33$^a$ and when the piston in the cylinder 31 is retracted to its inoperative position the end of the guard arm 185 is positioned laterally of the slot 33$^a$. When a coin is placed in the slot of the cylinder 31 and the piston projected, the rib 37 is moved away from the lower end of the lever 187 to permit the spring 185$^b$ to move the guard arm 185 over the slot 33$^a$. Therefore, when either piston in the cylinders 31 or 32 is projected and accidentally or otherwise retained in its projected position, insertion of a second coin in either of the slots 33$^a$ or 33$^b$ is prevented.

When all of the gasoline in the dispensing bowl 7 has been delivered and should the valve 92 fail, for any reason, to close by having the valve handle 110 still engaged with the catch 117 as shown in Figure 19, due possibly to inoperation of said catch, said valve handle 110 is released when either of the coin detector cylinders are operated and the horse shoe magnet 81 moved to extract a counterfeit coin through the side slot 85 in the first coin cylinder 69. As shown in Figure 19, the lever 190 spring pressed as at 190$^a$ and pivotally supported as at 191 upon the bracket 191$^a$ has a finger 192 overlying the bifurcated finger 122 of the catch 117 at one of its ends while the opposite end thereof engages the roller 78$^a$ at the pivotal connection between the lever 78 and link 83 under influence of the spring 190ᵃ so that when said magnet is operated, the lever 190 will be moved to the dotted line position shown in Figure 19 to move the catch 117 upon its pivot 118 to release the valve handle 110 and permit closing movement thereof by the spring 111.

If for any reason, the valve 93 should remain in its open position with the lug 140ᵇ engaged in the slot 132ᵃ of the piston rod 132, devices are carried by the piston in the cylinder 69 to engage the lever 139 to released engagement thereof with the piston rod. As shown in Figures 2, 6 and 8, the button 89 carried by the piston in the first coin control cylinder that works through the slot 90 carries an arm 193 projecting outwardly and forwardly thereof with the bent end 193ᵃ thereof positioned for working engagement with the lever 139 so that when the piston in the first coin control cylinder is projected, the arm engages the lever 139 to shift the same against the tension of the spring 141 to disengage said lever from the tubular piston rod 132 for closing movement of the valve 93. This arm 193 provides a safety device so that it will be impossible to effect the dispensing of gasoline until the overflow supply to the dispensing bowl 7 has been accomplished. When the tubular piston rod 73 in the cylinder 69 is projected for opening the valve 92, the lever 139 would be operated by the arm end 193ᵃ to ensure closing movement of the valve 93 upon retraction of the piston 132, and said valve 93 would be opened when the piston rod 132 is projected. When the piston rod 73 is projected and so retained by the lug 99ᵃ upon the latch lever 98 engaged in the notch 99 in the piston 73, gasoline is flowing into the dispensing bowl 7 and operation of the piston 132 is prevented by a device carried by the piston 131 in the cylinder 127 that cooperates with the inner end of the latch lever 98. When the piston rod 73 is projected and so retained, the inner pivoted end of the latch lever 98 is elevated and is disposed in the path of movement of the finger 194 on the upper end of the arm 195 that is carried by the piston rod 132 as shown in Figure 10. It being impossible to open the valve 93 by projecting the piston 132 when the piston rod 73 in the cylinder 69 is projected and is so retained until released by the overflow of gasoline from the dispensing bowl, it will be impossible to cause gasoline to flow by way of the valve 93 to the discharge hose 23.

It is also possible with this self-serving automatic dispensing mechanism to have the gasoline manually dispensed under the control of an attendant by making certain adjustments and disconnecting several elements. The connection between the rock shaft 94 and the air valve 16 is broken by removal of the link 96. The lower end of the lever 133 as shown in Figure 2 is manually shifted to project the piston rod 132 and said piston is held in its projected position by the latch hook 196 carried by the cylinder 127 that is moved into engagement with the button 131ᵃ carried by the piston 131. The depending arm 94ᵃ of the rock shaft 94 is then manually shifted for projecting the tubular piston rod 73 of the coin cylinder 69 and said piston rod is retained projected by the latch hook 196ᵃ carried by the cylinder 69. The three armed spider lever is then manually shifted and the hook 197 shown in Figure 6 that is pivoted as at 198 upon the end of the cylinder 32 is moved into engagement with the lever arm 166, which movement causes movement of the lever arm 167 to shift the lever 161 and disengage the clutch mechanism in the meter. The outer end of the discharge hose 23 is provided with a manually operable valve 199 which acts as a stop for the outlet flow of the gasoline. Gasoline is delivered to the dispensing bowl 7 by the manual operation of the air valve 16 and is delivered through the discharge hose 23 under the control of the valve 199. It will therefore be seen that the self-serving mechanism may be rendered inoperative and the manual control of the dispensing of gasoline accomplished.

It is also intended that the self-service attachment disclosed herein be associated with a pump stand that is hand operated, and in such gasoline dispensing devices there is not present the usual air compressing apparatus dispensing bowl and return pipe. Therefore, the arm 95 attached to the rock shaft 94 is eliminated together with the lever, link and overflow bucket devices shown in Figure 24 that are attached to the latch lever 98. In lieu of the parts removed, the latch lever 98ᵇ shown in Figure 25 is carried by the cylinder 69 and cooperates with the tubular piston rod 73 for holding the same projected after the valve 92 has been opened. An angle lever 200 is pivotally attached as at 201 to the casing wall 27 and at its lower end has a link connection 202 with the latch lever 98ᵇ adjacent its outer end. Gasoline is delivered by the hand pump directly to the pipe 22 shown in Figure 1 that leads to the meter 21 and when the proper amount of gasoline has passed through the meter, either of the rods 158 or 159 are elevated in a manner as previously described to free the valve handle 110, and said valve handle as shown in Figure 7 being moved into engagement with the arm 165 of the spider lever causes the arm 165 as shown in Figure 25 to engage the lever 200 to elevate the latch lever 98ᵇ to permit retraction of the piston rod 73 in the first coin control cylinder 69. The operation of the other mechanism of the attachment is the same as described in connection with its association with the overhead dispensing bowl 7. It having previously been stated that the meter 21 was at the outlet side of the bowl 7, said meter and valves 92 and 93 may well be positioned at the inlet side of the bowl. When so disposed, the gasoline under air pressure would be first delivered to the meter and through the valves 92 and 93 and when the meter was operated by the proper quantity of gasoline flowing therethrough the valves 92 and 93 would be closed, and only the proper amount of gasoline purchased would be delivered to the bowl so that if desired, the overflow pipe could be eliminated.

The detail operation of the invention having previously been set forth in the general description of the structural element, it is believed that the nature, construction and operation will be fully understood and while there are herein shown and described the preferred embodiments of the invention, it is nevertheless to be understood that minor changes may be made therein without departing from the spirit and scope of the invention as claimed.

What I claim as new is:—

1. In a self-service gasoline pump attachment, the combination with a main storage tank and means for transferring gasoline from the tank to a point of discharge, of cooperating coin controlled and meter mechanism for discharging different quantities of gasoline, said coin controlled mechanism comprising two coin cylinders sequentially operable by a coin delivered to the first cylinder and during operation of the first cylinder to be delivered to the second cylinder, said cylinders being rendered operative by two coins of different predetermined denominations for effecting the dispensing of different quantities of gasoline, separate cylinders for first receiving the coins, and a single chute extending between the separate cylinders and leading to the first coin controlled cylinder.

2. In a self-serving gasoline pump attachment, the combination with a main storage tank and means for transferring gasoline from the tank to a point of discharge, of cooperating coin controlled and meter mechanism for discharging different quantities of gasoline, said coin controlled mechanism comprising two coin cylinders sequentially operable by a coin delivered to the first cylinder and during operation of the first cylinder to be delivered to the second cylinder, said cylinders being rendered operative by two coins of different predetermined denominations for effecting the dispensing of different quantities of gasoline, separate cylinders for first receiving the coins, and a single chute extending between the separate cylinders and leading to the first coin controlled cylinder, said attachment having coin receiving slots and guard arms adapted to be moved over the slots upon operation of the coin controlled cylinders to prevent insertion of coins when the coin cylinders are operated.

3. In a self-service gasoline pump attachment, the combination with a main storage tank and means for transferring the gasoline from the tank to a point of discharge, a pair of valves and a meter in the path of transfer of the gasoline, a pair of coin controlled cylinders, operative connections between said valves and cylinders, a catch for holding one valve open upon return movement of the operative connection associated therewith and said other valve being positively operated in both directions of movement, means for holding the positively operated valve in open position, and means associated with the catch and last named means and operated by said meter for effecting release of the catch and valve holding means to permit closing movement of the valves.

4. In a self-service gasoline pump attachment, the combination with a main storage tank and means for transferring the gasoline from the tank to a point of discharge, a pair of valves and a meter in the path of transfer of the gasoline, a pair of coin controlled cylinders, operative connections between said valves and cylinders, a catch for holding one valve open upon return movement of the operative connection associated therewith and said other valve being positively operated in both directions of movement, means for holding the positively operated valve in open position, means associated with the catch and last named means and operated by said meter for effecting release of the catch and valve holding means to permit closing movement of the valves, and cooperating devices for effecting release of one valve during opening movement of the other valve.

5. In a self-serving gasoline pump attachment, the combination with a main storage tank and means for transferring the gasoline from the tank to a point of discharge, a pair of valves and a meter in the path of transfer of the gasoline, a pair of coin controlled cylinders, operative connections between said valves and cylinders, a catch for holding one valve open upon return movement of the operative connection associated therewith and said other valve being positively operated in both directions of movement, means for holding the positively operated valve in open position, means associated with the catch and last named means and operated by said meter for effecting release of the catch and valve holding means to permit closing movement of the valves, and means for preventing operation of one valve while the other valve is open.

6. In a self-service gasoline pump attachment, the combination with a main storage tank and means for transferring the gasoline from the tank to a point of discharge, of a pair of valves and a meter arranged in the path of transfer, said valves being independently operable and each comprising a handle, a pair of sequentially coin controlled cylinders wherein a coin in the first cylinder permitting operation thereof is delivered to the second cylinder during operation, a sliding abutment connection between the first cylinder and one valve handle for opening the valve associated therewith upon operation of the first coin cylinder, a tensioned catch associated with said valve handle for retaining the same in open position, a positive connection between the other cylinder and other valve handle whereby the last named valve handle is positively moved in opposite directions for effecting opening and closing movement of the valve associated therewith, means associated with the last named cylinder for holding the last named valve in open position and operative connections extending between the meter, tensioned catch and the means for holding the positively shifted valve in its open position for effecting release of the tensioned catch and valve holding means to permit closing movement of said valve when a desired quantity of gasoline has flowed through the meter.

7. In a self-service gasoline pump attachment, the combination with a main storage tank and means for transferring the gasoline from the tank to a point of discharge, of a pair of valves and a meter arranged in the path of transfer, said valves being independently operable and each comprising a handle, a pair of sequentially coin controlled cylinders wherein a coin in the first cylinder permitting operation thereof is delivered to the second cylinder during operation, a sliding abutment connection between the first cylinder and one valve handle for opening the valve associated therewith upon operation of the first coin cylinder, a tensioned catch associated with said valve handle for retaining the same in open position, a positive connection between the other cylinder and other valve handle whereby the last named valve handle is positively moved in opposite directions for effecting opening and closing movement of the valve associated therewith, means associated with the last named cylinder for holding the last named valve in open position and operative connections extending between the meter, tensioned catch and the means for holding the positively shifted valve in its open position for effecting release of the tensioned catch and valve holding means to permit closing movement of said valve when a desired quantity of gasoline has flowed through the meter, and said meter comprising adjustable elements to permit the dispensing of different quantities of gasoline.

8. In a self-service gasoline pump attachment, the combination with a main storage tank and means for transferring the gasoline from the tank to a point of discharge, of a pair of valves and a meter arranged in the path of transfer, said valves being independently operable and each comprising a handle, a pair of sequentially coin controlled cylinders wherein a coin in the first cylinder permitting operation thereof is delivered to the second cylinder during operation, a sliding abutment connection between the first cylinder and one valve handle for opening the valve associated therewith upon operation of the first coin cylinder, a tensioned catch associated with said valve handle for retaining the same in open position, a positive connection between the other cylinder and other valve handle whereby the last named valve handle is positively moved in opposite directions for effecting opening and closing movement of the valve associated therewith, means associated with the last named cylinder for holding the last named valve in open position and operative connections extending between the meter, tensioned catch and the means for holding the positively shifted valve in its open position for effecting release of the tensioned catch and valve holding means to permit closing movement of said valve, when a desired quantity of gasoline has flowed through the meter, and devices carried by the two cylinders and cooperating with the valve holding means adapted when shifted to effect the release of one of said valves and to prevent operation of the operating means for the other valve.

9. In a self-service gasoline pump attachment, the combination with a main storage tank and means for transferring the gasoline from the tank to a point of discharge, of a pair of valves and a meter arranged in the path of transfer, said valves being independently operable and each comprising a handle, a pair of sequentially coin controlled cylinders wherein a coin in the first cylinder permitting operation thereof is delivered to the second cylinder during operation, a sliding abutment connection between the first cylinder and one valve handle for opening the valve associated therewith upon operation of the first coin cylinder, a tensioned catch associated with said valve handle for retaining the same in open position, a positive connection between the other cylinder and other valve handle whereby the last named valve handle is positively moved in opposite directions for effecting opening and closing movement of the valve associated therewith, means associated with the last named cylinder for holding the last named valve in open position and operative connections extending between the meter, tensioned catch and the means for holding the positively shifted valve in its open position for effecting release of the tensioned catch and valve holding means to permit closing movement of said valve when a desired quantity of gasoline has flowed through the meter, said meter comprising adjustable elements to permit the dispensing of different quantities of gasoline, and devices carried by the two cylinders and cooperating with the valve holding means adapted when shifted to effect the release of one of said valves and to prevent operation of the operating means for the other valve.

10. In a self-service gasoline pump attachment, the combination with a main storage tank and means for transferring gasoline from the tank to a point of discharge and wherein said pump comprises an overhead dispensing bowl having an overflow return pipe to the main storage tank and an outlet pipe leading to a discharge hose, of a meter and a pair of control valves disposed in the outlet pipe of the dispensing bowl, a pair of coin control cylinders sequentially arranged, a pair of cylinders for respectively receiving coins of different denominations and delivering them to the first coin control cylinder, means associated with the first coin control cylinder for effecting delivery of gasoline from the storage tank to the dispensing bowl, means rendered operable upon overflow of gasoline to the return pipe for shutting off the supply means, a reciprocating piston in each coin control cylinder, operative connections between said pistons and valves and devices operated by the mechanism of the meter for releasing the valves to permit closing movement thereof.

11. In a self-service gasoline pump attachment, the combination with a main storage tank and means for transferring gasoline from the tank to a point of discharge and wherein said pump comprises an overhead dispensing bowl having an overflow return pipe to the main storage tank and an outlet pipe leading to a discharge hose, of a meter and a pair of control valves disposed in the outlet pipe of the dispensing bowl, a pair of coin control cylinders sequentially arranged, a pair of cylinders for respectively receiving coins of different denominations and delivering them to the first coin control cylinder, means associated with the first coin control cylinder for effecting delivery of gasoline from the storage tank to the dispensing bowl, means rendered operable upon overflow of gasoline to the return pipe for shutting off the supply means, a reciprocating piston in each coin control cylinder, operative connections between said pistons and valves and devices operated by the mechanism of the meter for releasing the valves to permit closing movement thereof, said connections including a catch associated with the valve opened by the first cylinder for retaining the valve opened, a lever associated with the piston of the other cylinder for retaining the other valve open, means for releasing the catch and the piston holding means of the second control cylinder whereby the two valves may be closed.

12. In a self-service gasoline pump attachment, the combination with a main storage tank and means for transferring gasoline from the tank to a point of discharge and wherein said pump comprises an overhead dispensing bowl having an overflow return pipe to the main storage tank and an outlet pipe leading to a discharge hose, of a meter and a pair of control valves disposed in the outlet pipe of the dispensing bowl, a pair of coin control cylinders sequentially arranged, a pair of cylinders for respectively receiving coins of different denominations and delivering them to the first coin control cylinder, means associated with the first coin control cylinder for effecting delivery of gasoline from the storage tank to the dispensing bowl, means rendered operable upon overflow of gasoline to the return pipe for shutting off the supply means, a reciprocating piston in each coin control cylinder, operative connections between said pistons and valves and devices operated by the mechanism of the meter for releasing the valves to permit closing movement thereof, and said meter mechanism comprising a pair of adjustable devices selectively operating the catch to effect release and closing movement of the valve.

13. In a self-service gasoline pump attachment, the combination with a main storage tank and means for transferring gasoline from the tank to a point of discharge and wherein said pump comprises an overhead dispensing bowl having an overflow return pipe to the main storage tank and an outlet pipe leading to a discharge hose, of a meter and a pair of control valves disposed in the outlet pipe of the dispensing bowl, a pair of coin control cylinders sequentially arranged, cylinders for respectively receiving coins of different denominations and delivering them to the first coin control cylinder, means associated with the first coin control cylinder for effecting delivery of gasoline from the storage tank to the dispensing bowl, means rendered operable upon overflow of gasoline to the return pipe for shutting off the supply means, a reciprocating piston in each coin control cylinder, operative connections between said pistons and valves and devices operated by the mechanism of the meter for releasing the valves to permit closing movement thereof, said connections including a catch associated with the valve opened by the first cylinder for retaining the valve opened, a lever associated with the piston of the other cylinder for retaining the other valve open, means for releasing the catch and the piston holding means of the second control cylinder whereby the two valves may be closed, and said meter mechanism comprising adjustable devices selectively operating the catch to effect release and closing movement of the valve.

14. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter.

15. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism.

16. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline.

17. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and means for rendering the meter inoperative at the time of closing the valves.

18. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline, and means for rendering the meter inoperative at the time of closing the valves.

19. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close.

20. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and said control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close, said meter comprising a pair of clutch elements with the disk wheels carried by one of the clutch elements that is movable and means for shifting the movable clutch element to inoperative position during closing movement of the valves.

21. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline, and means for rendering the meter inoperative at the time of closing the valves, one of said elements being primarily set to become operative with respect to its associated device when twice the quantity of gasoline has flowed through the meter that is required for rendering the other element operative, and means for holding the device associated with the element for effecting the lesser dispensing of the gasoline in its inoperative position with respect to the element.

22. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close, one of said disk wheels being primarily set to become operative with respect to its associated device when twice the quantity of gasoline has flowed through the meter that is required for rendering the other disk wheel operative, and means for holding the device associated with the disk wheel for effecting the lesser dispensing of the gasoline in its inoperative position with respect to the disk wheel.

23. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and said control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close, said meter comprising a pair of clutch elements with the disk wheels carried by one of the clutch elements that is movable and means for shifting the movable clutch element to inoperative position during closing movement of the valves, one of said disk wheels being primarily set to become operative with respect to its associated device when twice the quantity of gasoline has flowed through the meter that is required for rendering the other disk wheel operative, and means for holding the device associated with the disk wheel for effecting the lesser dispensing of the gasoline in its inoperative position with respect to the disk wheel.

24. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline, and means for rendering the meter inoperative at the time of closing the valves, one of said elements being primarily set to become operative with respect to its associated device when twice the quantity of gasoline has flowed through the meter that is required for rendering the other element operative, means for holding the device associated with the element for effecting the lesser dispensing of the gasoline in its operative position with respect to the element, and means rendered operable upon insertion of the coin of lesser denomination into the machine for moving the device associated with the element that dispenses the lesser quantity of gasoline into its operative position with respect to said element.

25. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close, one of said disk wheels being primarily set to become operative with respect to its associated device when twice the quantity of gasoline has flowed through the meter that is required for rendering the other disk wheel operative, means for holding the device associated with the disk wheel for effecting the lesser dispensing of the gasoline in its inoperative position with respect to the disk wheel, and means rendered operable upon insertion of the coin of lesser denomination into the machine for moving the device associated with the disk wheel that dispenses the lesser quantity of gasoline into its operative position with respect to said disk wheel.

26. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and said control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, the devices interposed between the meter and coin controlled mechanism comprising a pair of rods hooked with a hook at the upper ends thereof, the meter comprising a pair of rotatably adjustable disk wheels having protuberances for engagement with the rod hooks, whereby rotation of the disk wheels effects operation of the devices to release the valves to permit them to close, said meter comprising a pair of clutch elements with the disk wheels carried by one of the clutch elements that is movable and means for shifting the movable clutch element to inoperative position during closing movement of the valves, one of said disk wheels being primarily set to become operative with respect to its associated device when twice the quantity of gasoline has flowed through the meter that is required for rendering the other disk wheel operative, means for holding the device associated with the disk wheel for effecting the lesser dispensing of the gasoline in its inoperative position with respect to the disk wheel, and means rendered operable upon insertion of the coin of lesser denomination into the machine for moving the device associated with the disk wheel that dispenses the lesser quantity of gasoline into its operative position with respect to said disk wheel.

27. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said meter comprising clutch mechanism normally inoperative, and means interposed between one valve and the clutch mechanism for rendering the later operative upon opening movement of said last named valve.

28. In apparatus of the type described, a main storage tank, means for delivering gasoline from the storage tank to a point of discharge including a pipe, a meter and a pair of valves set into the pipe, coin controlled mechanism for operating the valves for moving them to open position, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline, means for rendering the meter inoperative at the time of closing the valves, and means for restoring the meter mechanism to its initial position upon being rendered inoperative.

29. In apparatus of the type described, a main storage tank, means for delivering gasoline from the storage tank to a point of discharge including a pipe, a meter and a pair of valves set into the pipe, coin controlled mechanism for operating the valves for moving them to open positon, and devices interposed between the meter and coin control mechanism for shifting the coin control mechanism to effect the release of the valves to permit them to move to closed positions when the desired quantity of gasoline has flowed through the meter, said coin control devices including means for holding the valves in open positions that are releasable by the meter mechanism, and a pair of relatively adjustable elements forming a part of the meter mechanism cooperating with the devices interposed between the meter and the coin control mechanism to effect release of the valves for the selective dispensing of two different quantities of gasoline, means for rendering the meter inoperative at the time of closing the valves, one of said elements being primarily set to become operative with respect to its associated device when twice the quantity of gasoline has flowed through the meter that is required for rendering the other element operative, means for holding the device associated with the element for effecting the lesser dispensing of the gasoline in its operative position with respect to the element, means rendered operable upon insertion of the coin of lesser denomination into the machine for moving the device associated with the element that dispenses the lesser quantity of gasoline into its operative position with respect to said element, and means operated by the coin controlled mechanism for dispensing the larger quantity of gasoline to positively release the means associated with the element that controls the dispensing of the lesser quantity of gasoline should the last named means fail to be released at the completion of operation.

In testimony whereof I affix my signature.

GEORGE W. KECK.